(12) United States Patent
Pandit et al.

(10) Patent No.: US 11,761,784 B2
(45) Date of Patent: Sep. 19, 2023

(54) REACHABILITY USER EXPERIENCE INTERFACES FOR AUTONOMOUS VEHICLES

(71) Applicant: Waymo LLC, Mountain View, CA (US)

(72) Inventors: Salil Pandit, Palo Alto, CA (US); Nirmal Patel, Sunnyvale, CA (US); Guilherme Villar, San Francisco, CA (US); Matthew Hall, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 124 days.

(21) Appl. No.: 17/102,697

(22) Filed: Nov. 24, 2020

(65) Prior Publication Data
US 2022/0163344 A1    May 26, 2022

(51) Int. Cl.
*G01C 21/36* (2006.01)

(52) U.S. Cl.
CPC ....... *G01C 21/3682* (2013.01); *G01C 21/367* (2013.01); *G01C 21/3617* (2013.01); *G01C 21/3694* (2013.01)

(58) Field of Classification Search
None
See application file for complete search history.

(56) References Cited

U.S. PATENT DOCUMENTS

| 8,185,299 B2 | 5/2012 | Fujiwara et al. |
| 8,239,130 B1 | 8/2012 | Upstill et al. |
| 8,676,427 B1 | 3/2014 | Ferguson et al. |

(Continued)

FOREIGN PATENT DOCUMENTS

| JP | 2018148782 A | 9/2018 |
| KR | 20180060602 A | 6/2018 |
| WO | 2014074203 A1 | 5/2014 |

OTHER PUBLICATIONS

International Search Report and Written Opinion for Application No. PCT/US21/57715 dated Feb. 18, 2022.

(Continued)

*Primary Examiner* — Anne Marie Antonucci
*Assistant Examiner* — Kyle S Park
(74) *Attorney, Agent, or Firm* — Botus Churchill IP Law LLP

(57) ABSTRACT

The technology involves communicating the reachability status associated with an autonomous vehicle to a user such as a rider within the vehicle, a person awaiting pickup, or a customer that scheduled a package deliver. Reachability information about pickup and/or drop off locations is presentable via an app on a user device, which helps set expectations with customers about where the vehicle is most likely to be able to perform a pickup and/or drop off. This may include indicating how much variance there may be based on current congestion, parking or idling regulations, or weather conditions. The reachability information may be presented via one or more visualization tools to indicate the uncertainty and/or likely final location. Presenting such contextual information may be done based on real time information, and the presentation may be updated as needed. Historical information about the location may also be used to lower the level of uncertainty.

21 Claims, 29 Drawing Sheets

(56) References Cited

U.S. PATENT DOCUMENTS

| | | | |
|---|---|---|---|
| 8,676,430 B1 | 3/2014 | Ferguson et al. | |
| 9,194,168 B1 | 11/2015 | Lu et al. | |
| 9,384,402 B1 | 7/2016 | Furman et al. | |
| 9,436,182 B2 | 9/2016 | Nemec et al. | |
| 9,465,388 B1 | 10/2016 | Fairfield et al. | |
| 9,506,763 B2 | 11/2016 | Averbuch et al. | |
| 9,707,966 B2 | 7/2017 | Herbach et al. | |
| 9,836,057 B2 | 12/2017 | Fairfield et al. | |
| 9,953,283 B2 | 4/2018 | Sweeney et al. | |
| 10,345,809 B2 | 7/2019 | Ross et al. | |
| 10,696,222 B1 | 6/2020 | Pandit et al. | |
| 11,062,602 B1* | 7/2021 | Beaurepaire | G08G 1/146 |
| 2008/0215202 A1 | 9/2008 | Breed | |
| 2013/0099892 A1 | 4/2013 | Tucker et al. | |
| 2015/0248131 A1 | 9/2015 | Fairfield et al. | |
| 2016/0117610 A1 | 4/2016 | Ikeda et al. | |
| 2017/0147959 A1* | 5/2017 | Sweeney | G07C 5/008 |
| 2017/0262802 A1 | 9/2017 | Swanson et al. | |
| 2017/0267233 A1 | 9/2017 | Minster et al. | |
| 2017/0344010 A1 | 11/2017 | Rander et al. | |
| 2018/0126950 A1 | 5/2018 | Alderman et al. | |
| 2019/0051155 A1 | 2/2019 | Yamaguchi | |
| 2019/0286126 A1* | 9/2019 | Williams | G08G 1/202 |
| 2020/0124427 A1* | 4/2020 | Kline | G07C 5/008 |
| 2021/0080279 A1* | 3/2021 | Leary | G01C 21/367 |
| 2021/0326783 A1* | 10/2021 | Kim | G08G 1/202 |

OTHER PUBLICATIONS

Accessible Pedestrian Signals, A Guide to Best Practices, WALK Indication, Chapter 4, 2016, pp. 1-5.

Fagnant, Daniel J., et al., Operations of a Shared Autonomous Vehicle Fleet For the Austin, Texas Market, Transportation Research Record, pp. 1-17, 2015.

Rogers, Greg, AVision: Rideshare and Autonomous Vehicles, The Autonomer, 2015, pp. 1-16.

* cited by examiner

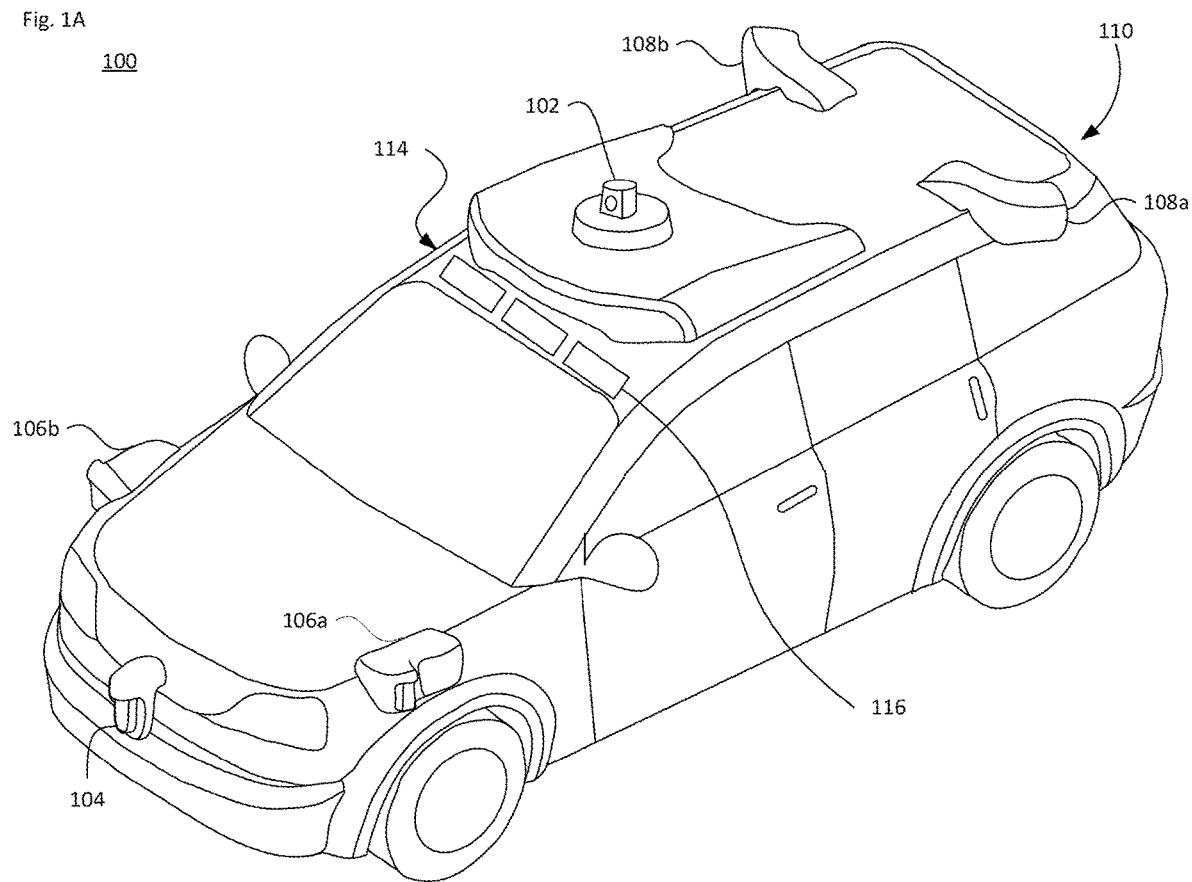

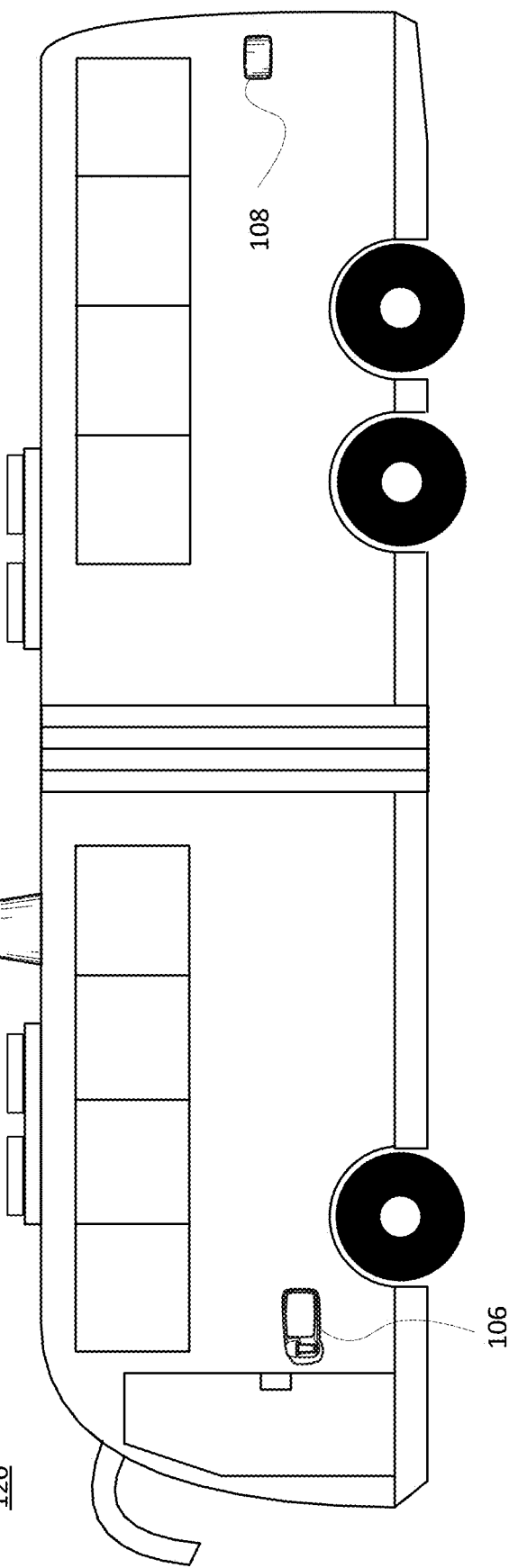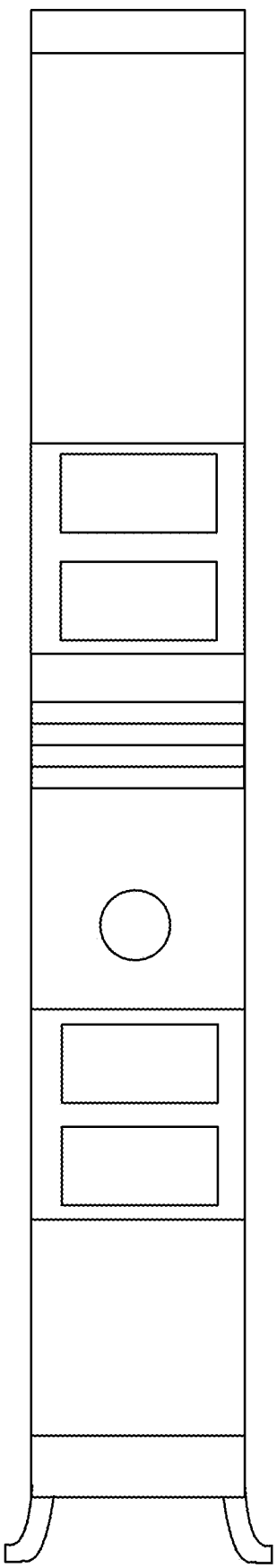

300

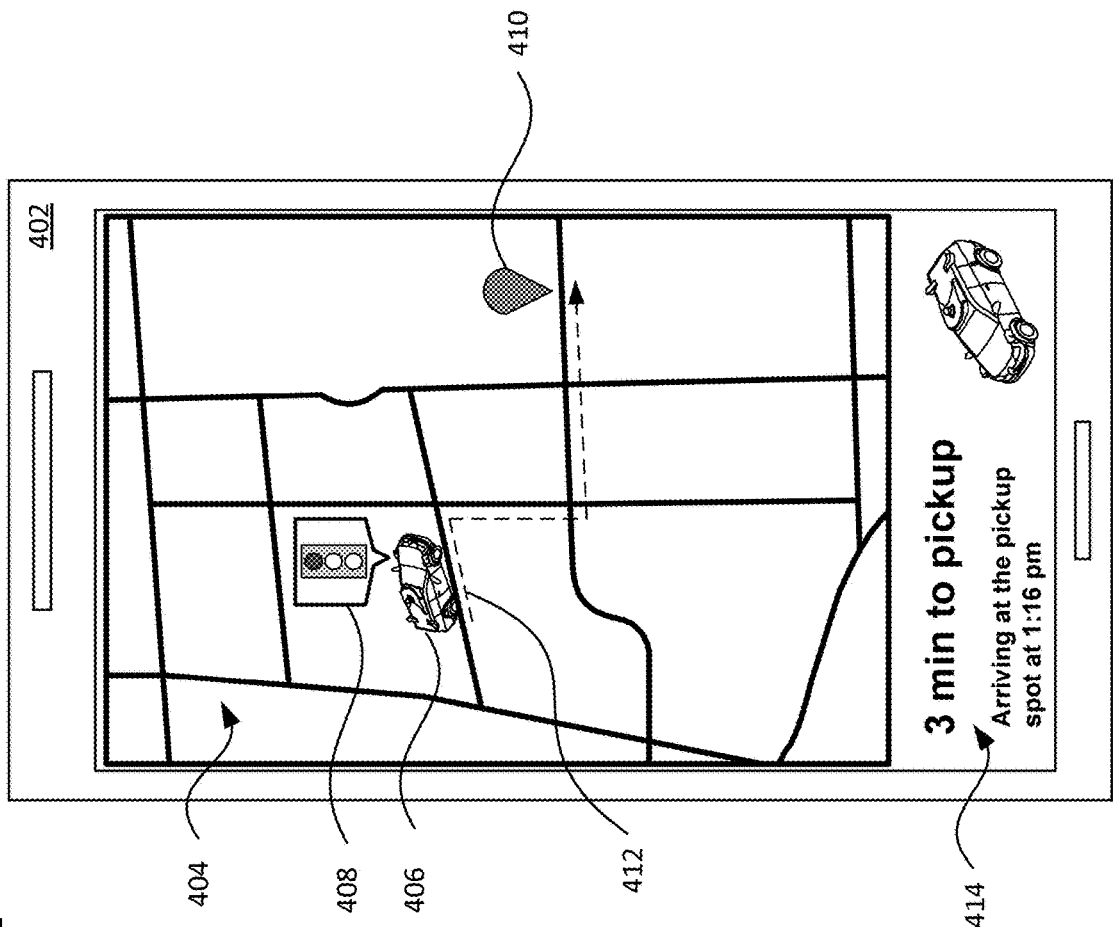

600

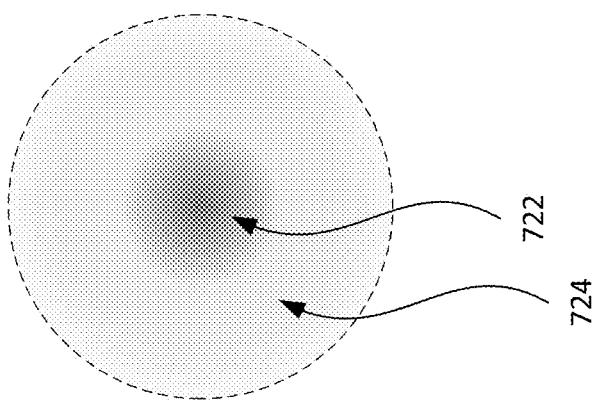
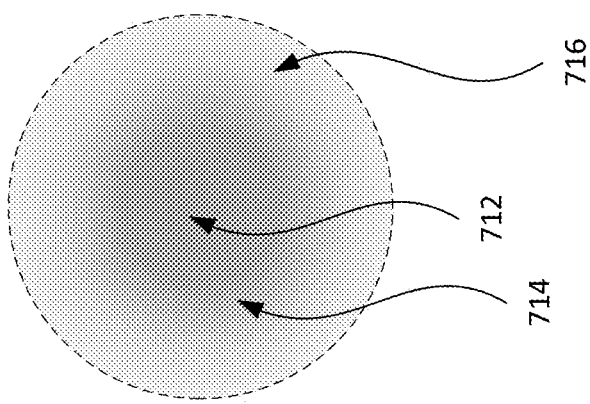
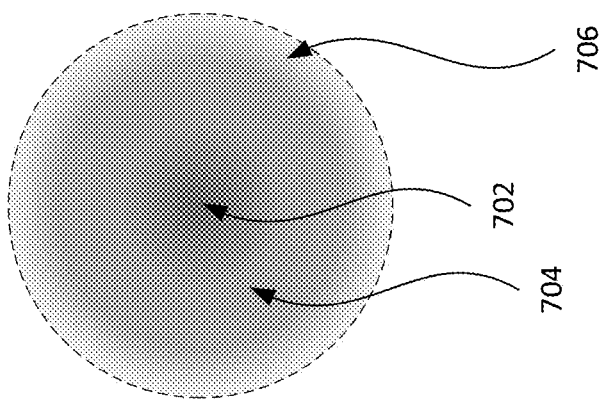

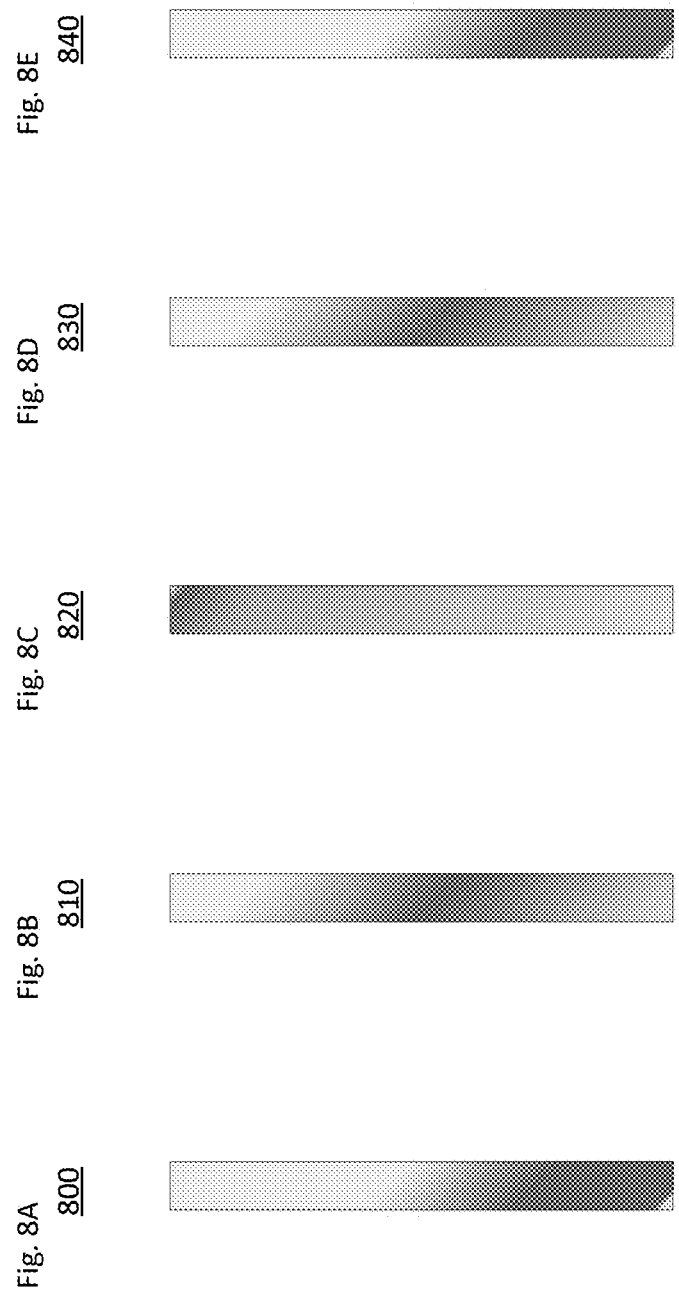

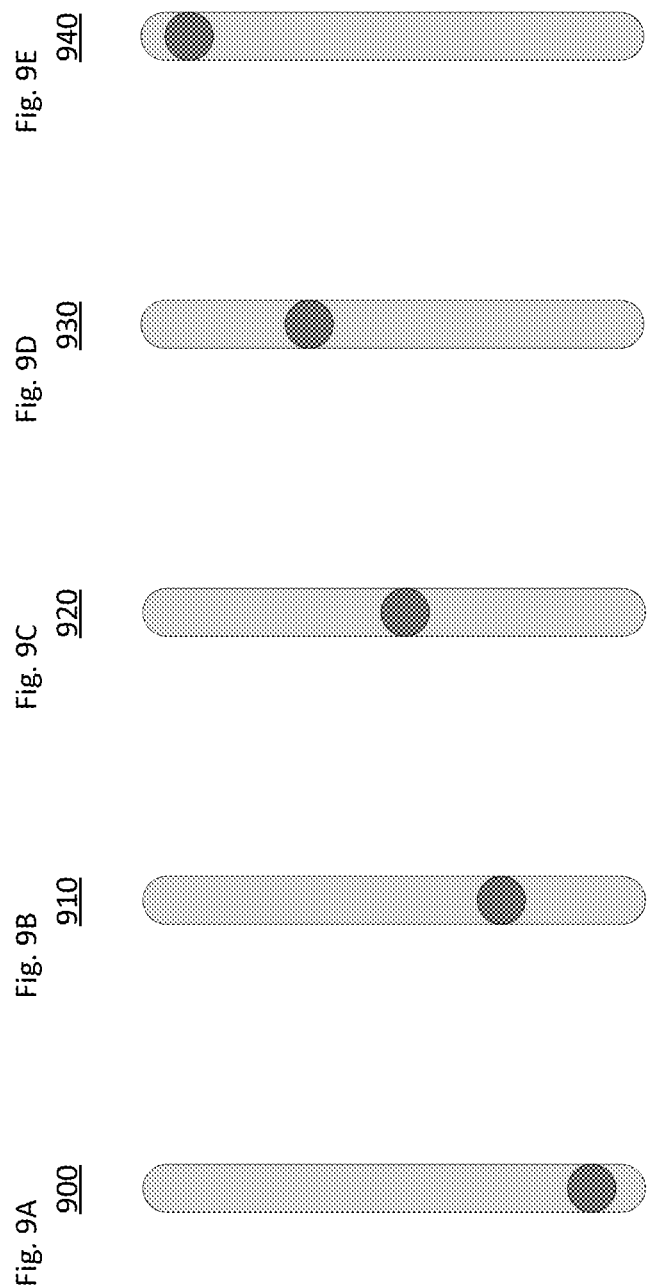

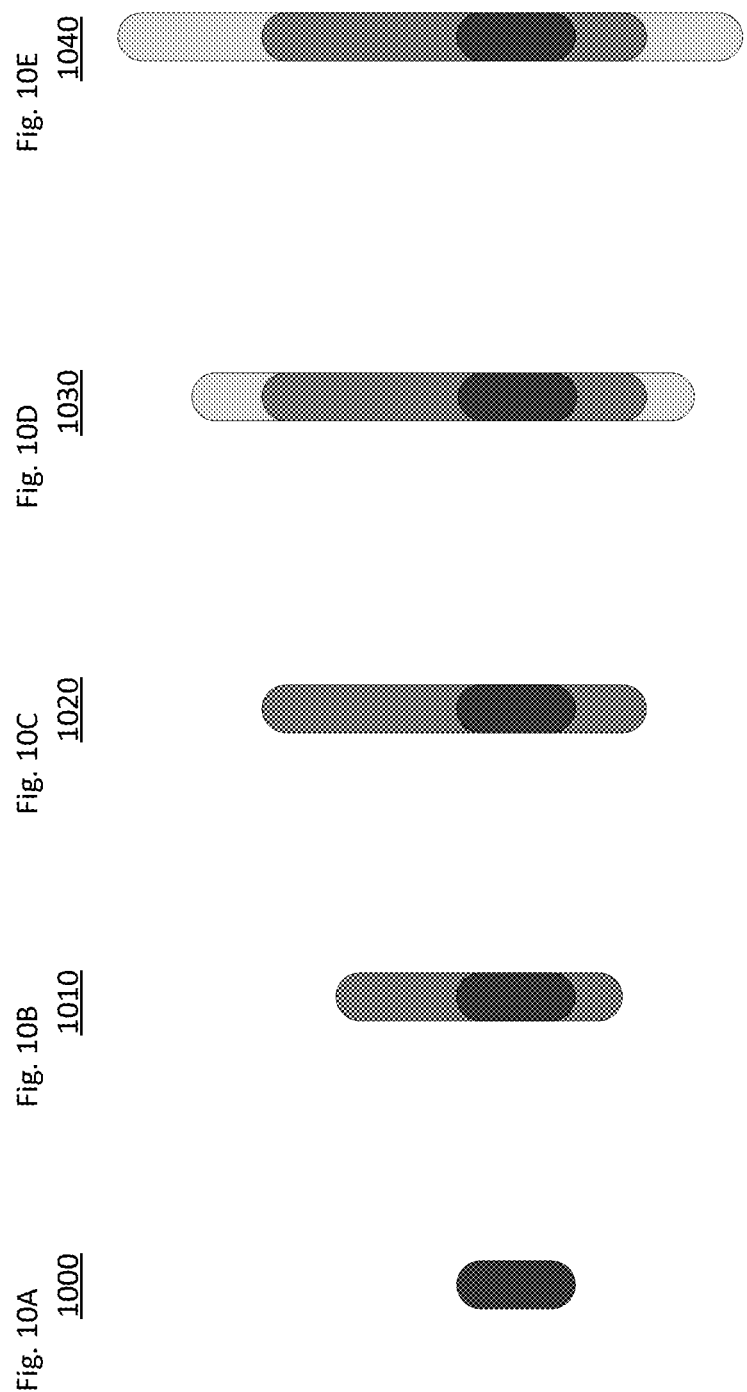

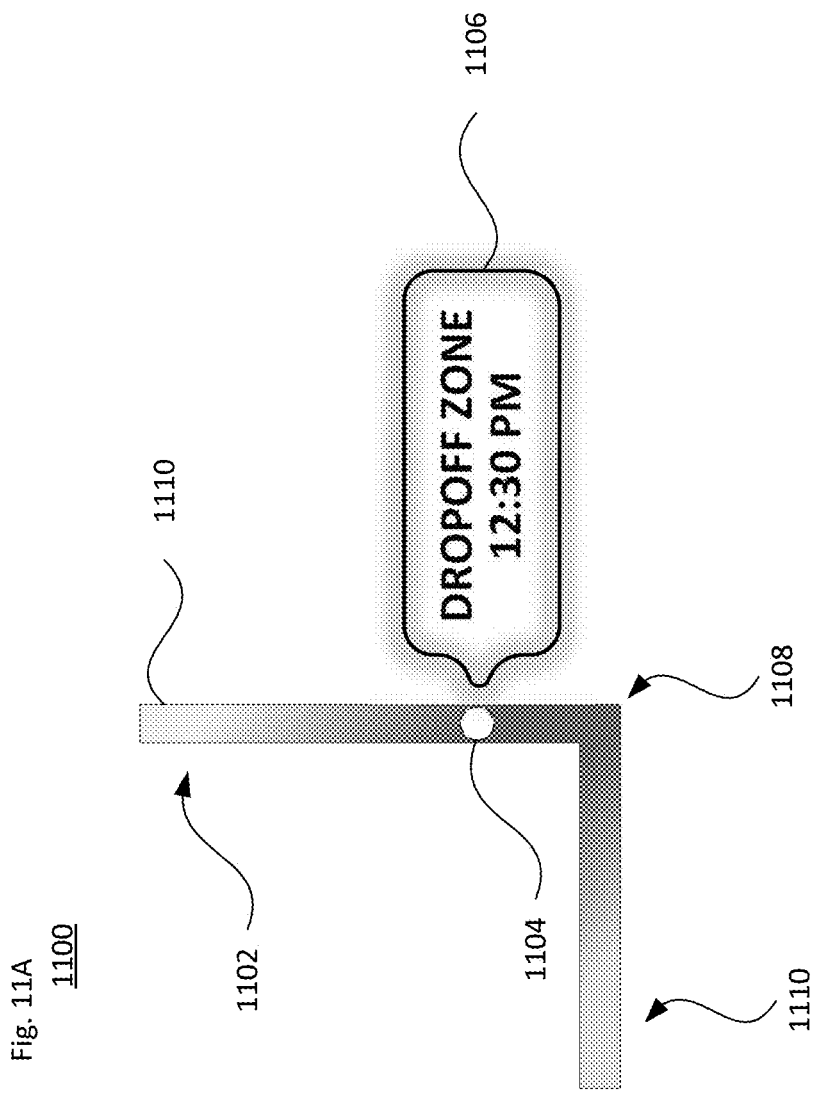

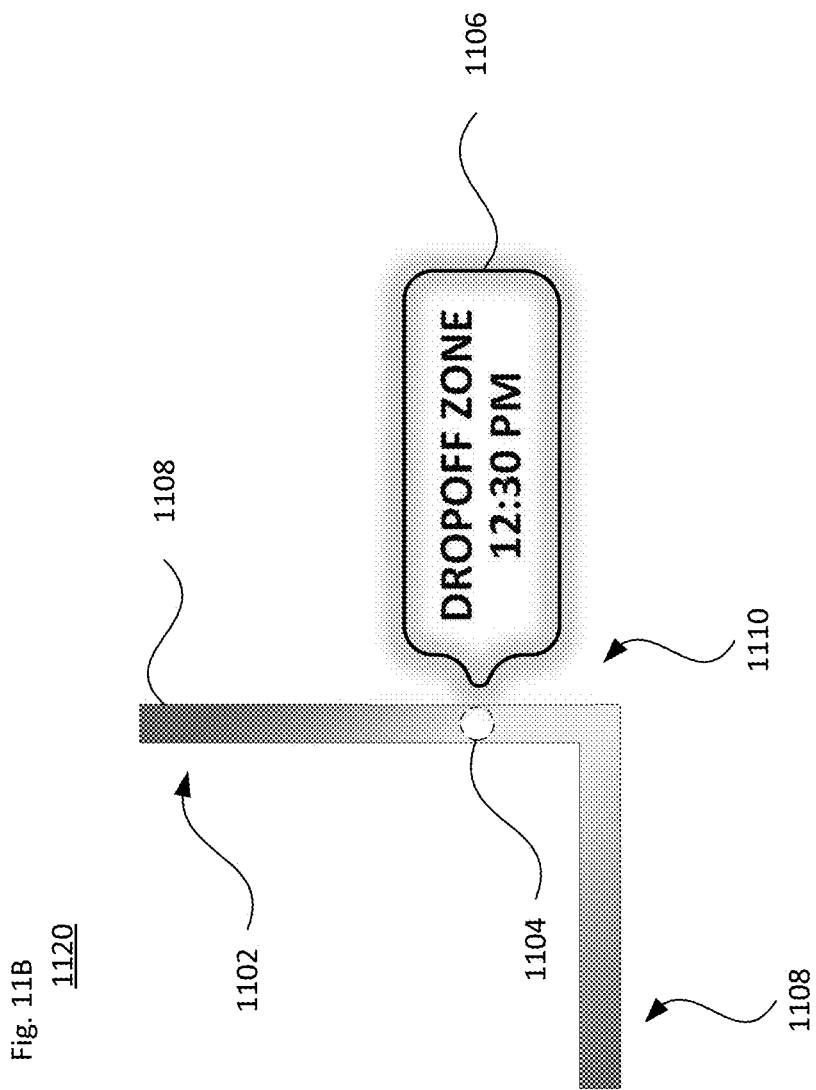

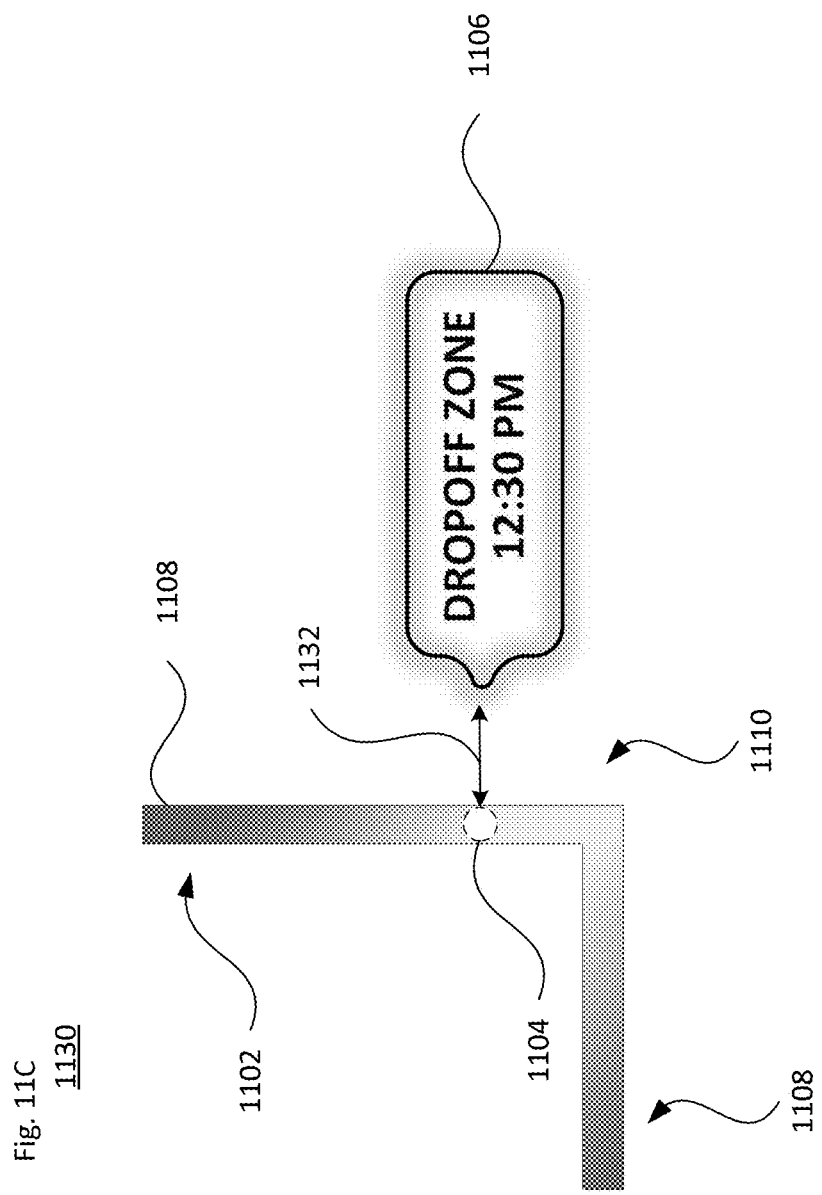

1400

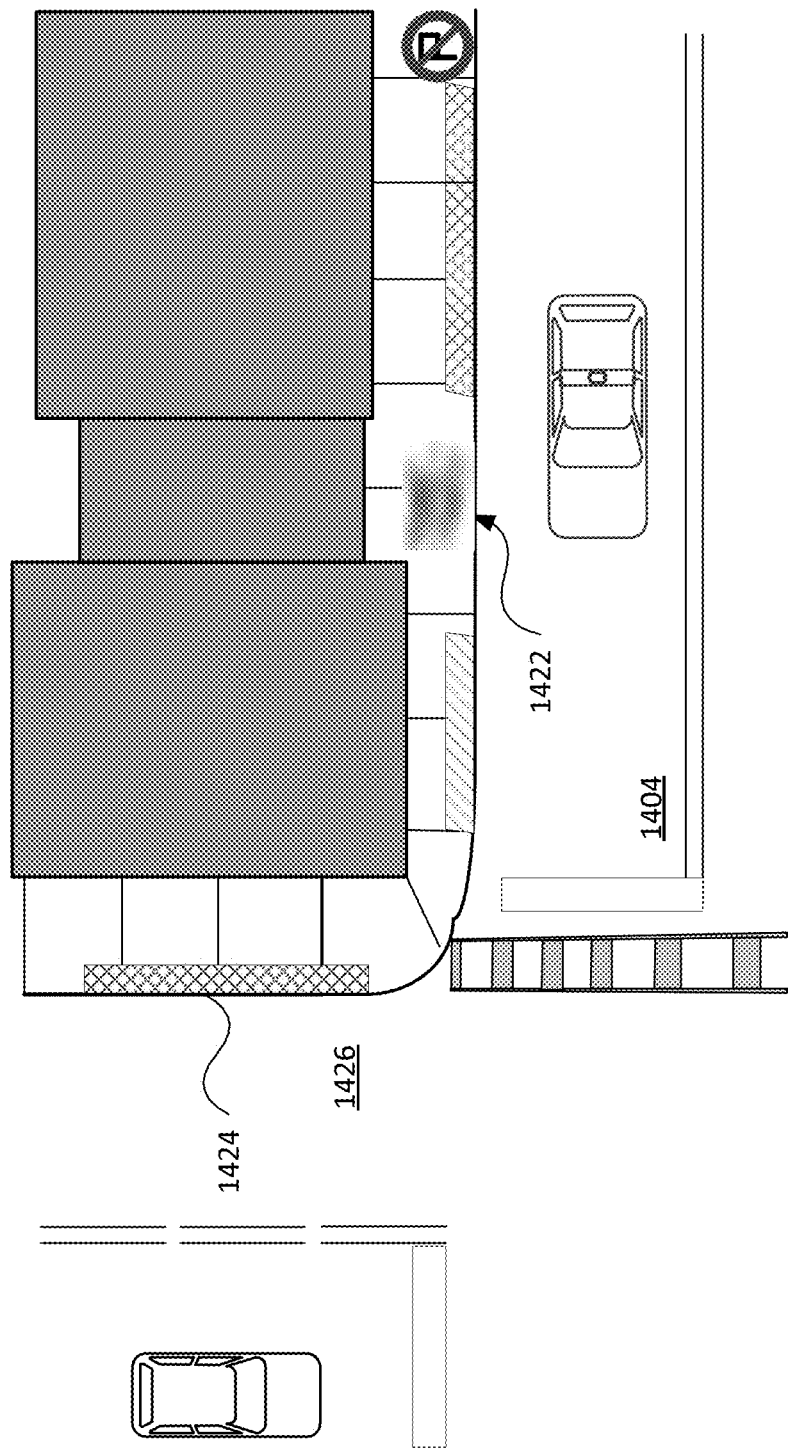

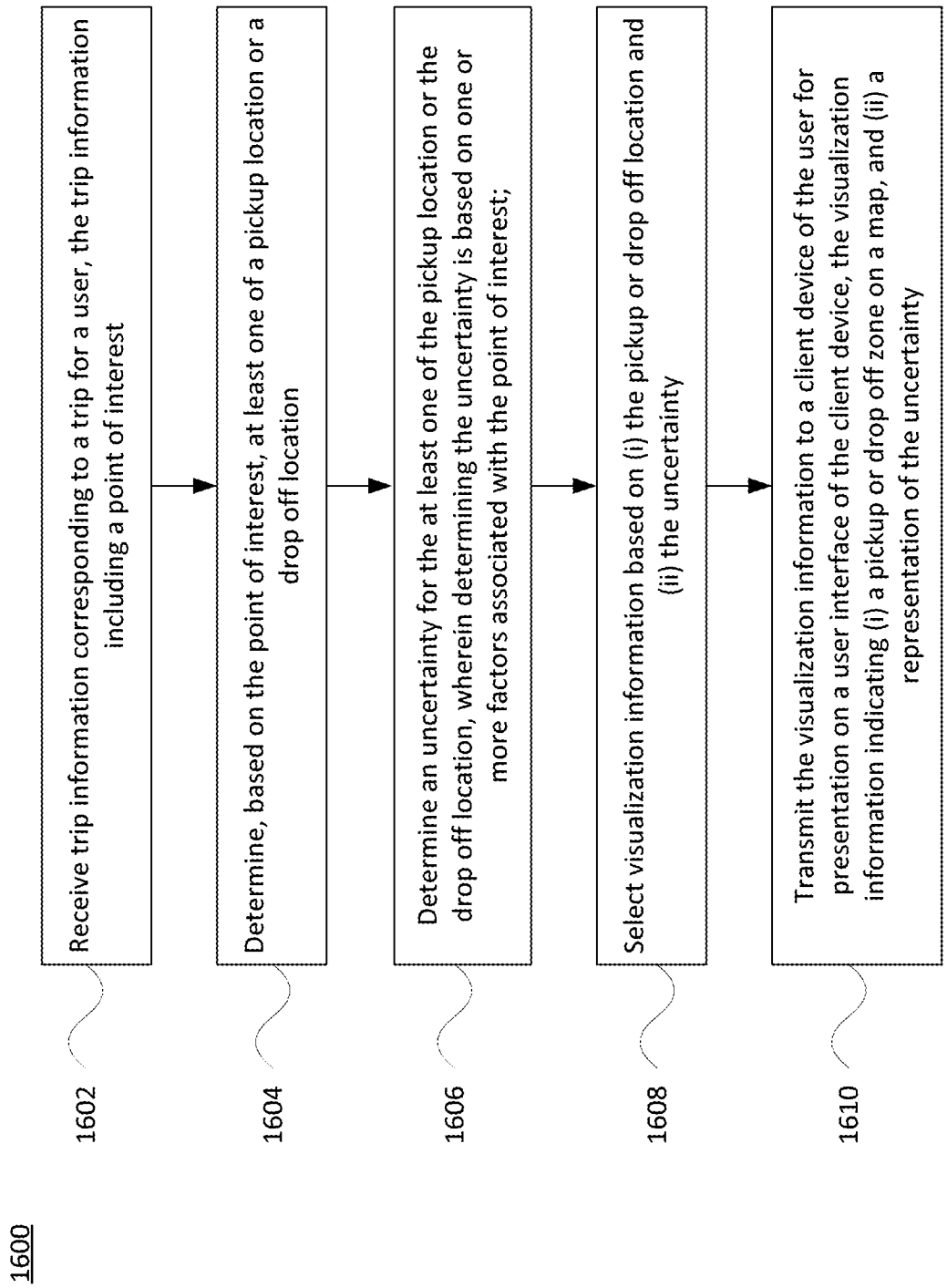

REACHABILITY USER EXPERIENCE INTERFACES FOR AUTONOMOUS VEHICLES

BACKGROUND

Autonomous vehicles, such as vehicles that do not require a human driver, can be used to aid in the transport of passengers or package or cargo deliveries from one location to another. Such vehicles may operate in a fully autonomous mode without a person providing driving input. In this driving mode, the vehicle may make a variety of operational decisions, including pickup or drop off locations. While an initial location may be requested by a user or otherwise selected, it may not be feasible to perform the pickup or drop off at that initial location due to various factors such as road congestion, parking or idling regulations, etc. This may cause confusion for a rider or other user, which can result in pickup or drop off delays and a negative user experience.

BRIEF SUMMARY

The technology relates to communicating the reachability status associated with a self-driving (autonomous) vehicle to users, including riders within the vehicle, users awaiting pickup, or customers that have scheduled for pickup or drop off of packages or other cargo. Certain reachability information about pickup and/or drop off locations may be presented to riders or other users via an app on a user device (e.g., mobile phone, tablet PC, wearable computer) and/or vehicle display components (e.g., internal display screens or external signage). The user interface that presents this information helps set expectations with riders and other users about where the autonomous vehicle is most likely to be able to perform a pickup and/or drop off. This may include indicating how much variance there may be based on congestion, parking or idling regulations, weather conditions, etc.

According to aspects of the technology, a method is provided comprising: receiving, by one or more processors associated with a vehicle operating in an autonomous driving mode, trip information corresponding to a trip for a user, the trip information including a point of interest; determining, by the one or more processors based on the point of interest, at least one of a pickup location or a drop off location; determining, by the one or more processors, an uncertainty for the at least one of the pickup location or the drop off location, wherein determining the uncertainty is based on one or more factors associated with the point of interest; selecting, by the one or more processors, visualization information based on (i) the pickup or drop off location, and (ii) the uncertainty; and transmitting the visualization information to a client device of the user for presentation on a user interface of the client device, the visualization information indicating (i) a pickup or drop off zone on a map, and (ii) a representation of the uncertainty.

In one example, the visualization information is modifiable in response to user interaction with the user interface.

In another example, determining the uncertainty includes identifying a location variance based on one or more of traffic congestion, street regulations, or weather conditions. Here, determining the uncertainty may further include evaluating historical information associated with the point of interest.

In yet another example, determining the uncertainty includes evaluating a likelihood that another vehicle will be at the pickup or drop off zone for a minimum amount of time. Here, evaluating the likelihood may include determining whether the minimum amount of time would coincide with a pickup or drop off action of the vehicle.

In a further example, the visualization information includes a viewfinder element that is modifiable in response to user interaction with a user interface of the client device. The visualization information may further include a location identifier that snaps to a road segment in response to the user interaction with the user interface. In this case, the location identifier may include an inner zone and an outer zone, the inner and outer zones providing an indicia to the user that one part of the pickup or drop off zone is a more likely pickup or drop off location than another part of the pickup or drop off zone.

According to another example, the visualization information includes an elongated bar aligned along a segment of roadway or a segment of sidewalk to indicate the pickup or drop off zone. In this case, the elongated bar may include a color difference, intensity or gradient to indicate to the user a relative size of the pickup or drop off zone along the segment of roadway or the segment of sidewalk. The elongated bar may include a geometric element therein, the geometric element indicating information about the pickup or drop off zone. The information about the pickup or drop off zone may indicate the uncertainty. A speed of travel of the geometric element within the elongated bar may correlate with the uncertainty. The geometric element may comprise a set of nested geometric objects having different appearances. The visualization information may further include a tag pointing to the geometric element, in which the tag provides textual or graphical information about a time of arrival at the pickup or drop off zone. For instance, the tag may move away from and towards the geometric element to accentuate information about the pickup or drop off zone. The visualization information may further include textual information for presentation on a card portion of the user interface adjacent to the map.

In another example, the one or more processors associated with the vehicle are part of an onboard control system of the vehicle. And in a further example, the one or more processors associated with the vehicle are part of a remote server system in real time communication with the vehicle during operation in the autonomous driving mode.

BRIEF DESCRIPTION OF THE DRAWINGS

FIGS. 1A-B illustrate an example passenger-type vehicle configured for use with aspects of the technology.

FIGS. 1C-D illustrate an example articulated bus arrangement for use with aspects of the technology.

FIG. 4 illustrates an example of displayed trip status information in accordance with aspects of the technology.

FIGS. 7A-C illustrate visualizations using gradients to indicate uncertainty in possible locations in accordance with aspects of the technology.

FIGS. 8A-E illustrate an example set of visualizations in accordance with aspects of the technology.

FIGS. 9A-E illustrate another example set of visualizations in accordance with aspects of the technology.

FIGS. 10A-E illustrate a further example set of visualizations in accordance with aspects of the technology.

FIGS. 11A-C illustrate another example set of visualizations in accordance with aspects of the technology.

FIGS. 14A-B illustrate views of pickup or drop off locations in accordance with aspects of the technology.

FIG. 16 illustrates an example method in accordance with aspects of the technology.

DETAILED DESCRIPTION

Aspects of the technology involve a reachability-focused user interface that provides pickup and/or drop off information to riders or others users of a vehicle operating in an autonomous driving mode. Location variance information and other contextual information may be communicated via an app on a user's device (e.g., mobile phone, tablet or laptop PC, wearable, or other computing device) and/or an in-vehicle user interface. As discussed further below, the contextual information may inform the user as to where (and why) the vehicle will be performing a pickup or drop off action. Providing this information in real time based on current information may reduce confusion and set realistic user expectation regarding a trip.

For instance, when requesting a trip, a customer or other user may use an app on their device to communicate with a self-driving vehicle or a back-end ride or delivery service. This can include selecting the pickup and/or drop off location, for example by dropping a pin or other marker in a graphical interface via an app of the device to identify a location (e.g., one or more sections of sidewalk/street) for the pickup or drop off. However, this initially selected location may not be feasible or there may be safety or other considerations due to traffic congestion, regulations against parking or idling, weather conditions (e.g., an icy sidewalk or a large puddle along that part of the street). Therefore, in one scenario the vehicle (or back-end service) may change the pickup or drop off spot. This can include changing the specific location (e.g., corner of Main St. and Elm St.) to another point (e.g., halfway up Elm St. next to the mailbox) because a car is parked too close to the initially selected location. It could also include providing a zone (e.g., a set of contiguous locations). In this case, the user interface may convey a level of uncertainty using the zone, because it may not be clear at that point in time what exact location is optimal or available for pickup or drop off.

One or more visualization tools may be presented on the display to indicate the uncertainty and/or likely final location. According to one aspect, presenting such contextual information may be done based on real time information (e.g., what the perception system of the vehicle detects as it approaches the selected location). Historical information about the location may also be used to lower the level of uncertainty or to otherwise narrow down likely locations to complete the pickup or drop off. Any changes may be presented to the user when updated information is available, or when the user is interacting with the user interface.

The type(s) of information and how it is communicated may depend on where a rider is sitting within the vehicle (e.g., front seat v. rear seat, left side v. right side) or where a person awaiting pickup or awaiting a package delivery is located.

Example Vehicle Systems

Figure 1B:
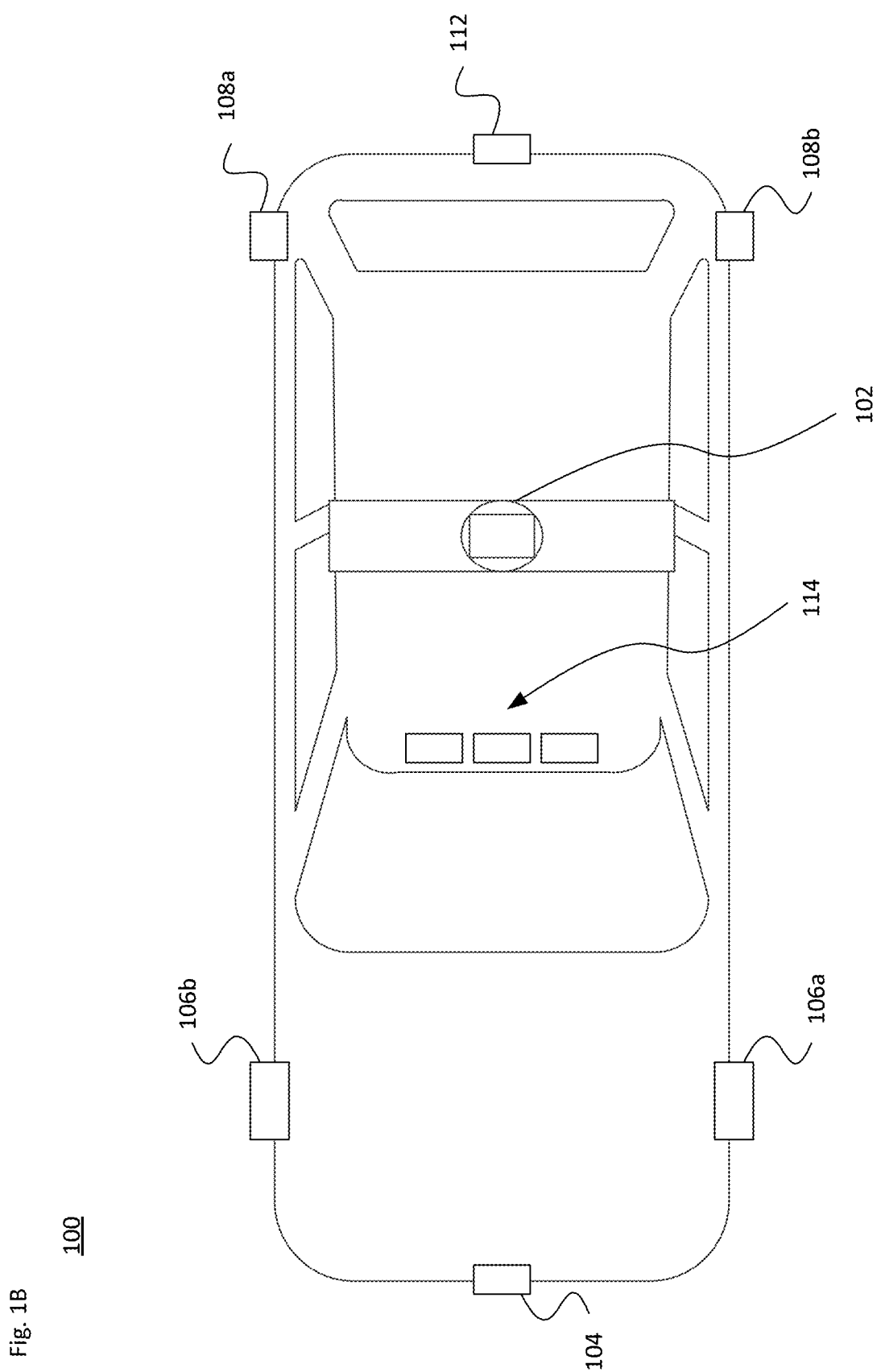

FIG. 1A illustrates a perspective view of an example passenger vehicle 100, such as a minivan, sport utility vehicle (SUV) or other vehicle that may be used in accordance with aspects of the technology to pick up and drop off passengers, make food deliveries, transport cargo, etc. FIG. 1B illustrates a top-down view of the passenger vehicle 100. As shown, the passenger vehicle 100 includes various sensors for obtaining information about the vehicle's external environment, which enable the vehicle to operate in an autonomous driving mode. For instance, a roof-top housing 102 may include one or more lidar sensors as well as various cameras, radar units, infrared and/or acoustical sensors. Housing 104, located at the front end of vehicle 100, and housings 106a, 106b on the driver's and passenger's sides of the vehicle, may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (112 in FIG. 1B) may be positioned along the rear of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces (not shown).

FIGS. 1C-D illustrate an example of another type of vehicle 120, such as an articulated bus, which may be employed in accordance with aspects of the technology, such as to pick up and drop off passengers. As with the passenger vehicle 100, the articulated bus 120 may include one or more sensor units disposed along different areas of the vehicle.

By way of example, each sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle configured for self-driving in an autonomous driving mode, including, but not limited to, cars, vans, cargo trucks, motorcycles, buses, recreational vehicles, emergency vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive fully autonomously without human assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
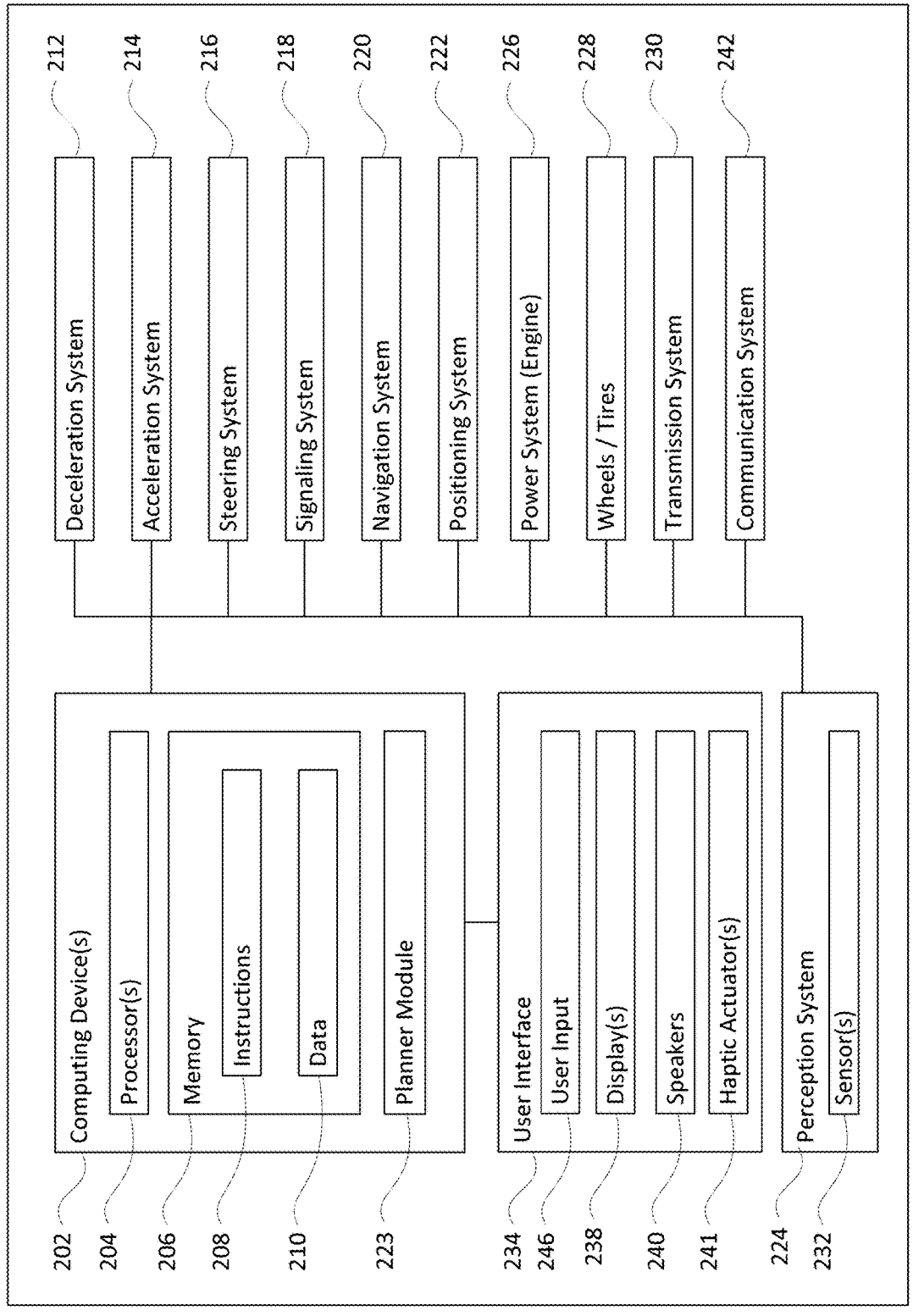
FIG. 2 is a block diagram of systems of an example vehicle in accordance with aspects of the technology.

FIG. 2 illustrates a block diagram 200 with various components and systems of an exemplary vehicle, such as passenger vehicle 100 or bus 120, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or obtained sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an on-board autonomous driving computing system incorporated into vehicle 100. The autonomous driving computing system is configured to communicate with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination, selecting a pickup and/or drop-off point or zone, or for otherwise making modifications to various driving aspects in view of current or expected traffic, weather or other conditions.

The computing devices 202 are also operatively coupled to a perception system 224 (that is configured to detect objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights or signs, street lamps, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

While the map information may be an image-based map, the map information need not be entirely image based (e.g., raster). For example, the map information may include one or more roadgraphs or graph networks of information such as roads, lanes, intersections, and the connections between these features. Each feature may be stored as graph data and may be associated with information such as a geographic location and whether or not it is linked to other related features. For example, a stop light, stop sign or street lamp may be linked to a road and an intersection, etc. In some examples, the associated data may include grid-based indices of a roadgraph to allow for efficient lookup of certain roadgraph features.

The perception system 224 includes sensors 232 for detecting objects external to the vehicle. The sensors 232 are located in one or more sensor units around the vehicle. The detected objects may be other vehicles, obstacles in the roadway, traffic signals, signs, trees, bicyclists, pedestrians, etc. The sensors 232 may also detect certain aspects of weather or other environmental conditions, such as snow, rain or water spray, or puddles, ice or other materials on the roadway.

By way of example only, the perception system 224 may include one or more lidar sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc. Information obtained from the sensors may include 2D or 3D point cloud data (e.g., for radar or lidar sensors), imagery from the cameras or other optical imaging devices, sound data across one or more frequency bands, etc.

The perception system 224 may also include other sensors within the vehicle to detect objects and conditions within the vehicle, such as in the passenger compartment. For instance, such sensors may detect, e.g., one or more persons, pets, packages or other cargo, etc., as well as conditions within and/or outside the vehicle such as temperature, humidity, etc. This can include detecting where the rider(s) is sitting within the vehicle (e.g., front passenger seat versus second or third row seat, left side of the vehicle versus the right side, etc.). The interior sensors may detect the proximity, position and/or line of sight of the rider in relation to one or more display devices of the passenger compartment. Still further, sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223, including adjustments in operation to deal with occlusions, congestion or other roadway issues, weather, etc.

As illustrated in FIGS. 1A-B, certain sensors of the perception system 224 may be incorporated into one or more sensor assemblies or housings. In one example, these may be integrated into the side-view mirrors on the vehicle. In another example, other sensors may be part of the roof-top housing 102, or other sensor housings or units 106a,b, 108a,b, 112 and/or 116. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. By way of example, displays may be located, e.g., along the dashboard, on the rear of the front row of seats, on a center console between the front row seats, along the doors of the vehicle, extending from an armrest, etc. Other output devices, such as speaker(s) 240 and/or haptic actuators 241 may also be located within the vehicle. There may also be one or more vehicle sound generators and/or external speakers, which may be used to communicate information to riders or other people outside the vehicle, especially at pickup. The display(s) and/or other output devices may be used to indicate to a rider the location of a drop off point or other location of interest, an estimated time until disembarking, or other relevant ride-related information.

The passenger vehicle also includes a communication system 242. For instance, the communication system 242 may also include one or more wireless configurations to facilitate communication with other computing devices, such as rider computing devices within the vehicle, computing devices external to the vehicle such as with users awaiting pickup (or delivery of a package, etc.), in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

While the components and systems of FIG. 2 are generally described in relation to a passenger vehicle arrangement, as noted above the technology may be employed with other types of vehicles, such as the bus 120 of FIGS. 1C-D.

In this type of larger vehicle, the user interface elements such as displays, microphones, speakers or haptic actuators may be distributed so that each rider has their own information presentation unit and/or one or more common units that can present status information to larger groups of riders.

Example Implementations

In view of the structures and configurations described above and illustrated in the figures, various aspects will now be described in accordance with aspects of the technology.

A self-driving vehicle, such as a vehicle with level 4 or level 5 autonomy that can perform driving actions without human operation, has unique requirements and capabilities. This includes making driving decisions based on a planned route and pickup and drop off locations, received traffic information, and objects in the external environment detected by the sensors of the vehicle's perception system. As notes above, traffic congestion, legal restrictions on parking or loitering, inclement weather or other conditions may affect the ability of the vehicle to pick up or drop off passengers or cargo (e.g., groceries or packages) at an initially selected location. There may be some uncertainty about where a pickup or drop off will be made, and that uncertainty may be clarified as the vehicle approaches the location of interest. According to one aspect, a change to the pickup or drop off location as determined by the vehicle (or back end system, e.g., for a fleet of vehicles) should be communicated to a rider or other user when that change happens. This can involve updating a display screen on the user's device, such as by showing a modified location or zone encompassing a set of possible locations, visualizing or otherwise indicating any uncertainty regarding the location, etc. Such information may also or alternatively be presented to one or more passengers using displays, speakers or other output devices that are disposed in the passenger compartment of the vehicle, or via an external speaker or vehicle sound generator, which may be particularly beneficial at pickup.

Example Scenarios

In one example, the reachability interface may present the vehicle's up to date location and route to a rider awaiting pickup on a map so that the rider can plan ahead how he or she will meet the vehicle. For instance, a waiting rider viewing the displayed map may be able to readily determine whether he or she needs to cross the street, walk toward a recognizable object (e.g., a mailbox, business sign, street corner, etc.), or move to where the car is likely to find parking along the route (e.g., a painted curb, such as where a white, green or yellow curb may indicate a pickup/drop off area that may or may not have parking restrictions, etc.). In another example, a rider may adjust a view of the drop off location in the reachability interface. In response to this, the reachability interface may reposition the map and update the drop off location (or zone), using up to date information to give the rider a current picture of where they are most likely to be dropped off.

Textual or audible narratives may be provided that explain what the vehicle is doing. However, a visualization in conjunction with the displayed map is employed so that the rider or other user can readily see whether the drop off or pickup location has been updated, whether there is any uncertainty associated with the location and/or to help set expectations about where the vehicle is most likely to be able to pick up or drop off, and how much variance there may be based on congestion, parking regulations, etc.

In one aspect, a user may download an application for requesting a vehicle to a client computing device. For example, users may download the application via a link in an email, directly from a website, or an application store to their respective client computing devices, such as mobile phones, tablet PCs, laptops or wearable computers (e.g., smart watches). In response to user input, a client computing device may transmit a request for the application over the network, for example, to one or more server computing devices, and in response, receive the application. The application may be installed locally at the client computing device.

The user may use the application to request a vehicle. As part of this, the user may identify a pickup location, a drop off location, or both. Any intermediate stops may also be identified (e.g., stopping off at a supermarket on the way home after work). In this regard, the drop off location may be a physically different location from an ultimate destination location.

A rider or other user may specify a pick up, intermediate destination, and final destination locations in various ways. As an example, a pickup location can be defaulted to a current location of the user's client computing device (e.g., based on GPS or other location information for the client computing device). Alternatively, the pickup location may be a recent or saved location associated with the user's account. The user may enter an address or other location information (e.g., via typing or speaking the location), tap a location on a map or select a location from a list in order to identify a pickup and/or destination location.

For instance, the user's client computing device may send its current location, such as a GPS location, to one or more server computing devices via a network, and/or a destination name or address for any intermediate and the final destination. In response, the one or more server computing devices may provide one or more suggested locations or may identify the current location as a pickup location and locations corresponding to the destination name or address as an intermediate or final destination for the vehicle. Once the user has selected or confirmed the pickup and drop off locations, the one or more server computing devices may assign a vehicle, such as vehicle 100, to the user. Dispatching instructions may be sent to the assigned vehicle, including the pickup location, any intermediate destination(s), and the final destination (final drop off location). This may cause the vehicle to control itself in the autonomous driving mode towards the pickup location, for instance by using the various systems of the vehicle as described above, in order to initiate and complete the trip. Although the examples herein relate to transporting passengers, similar features may be used for the transportation of goods or other cargo.

Figure 3A:
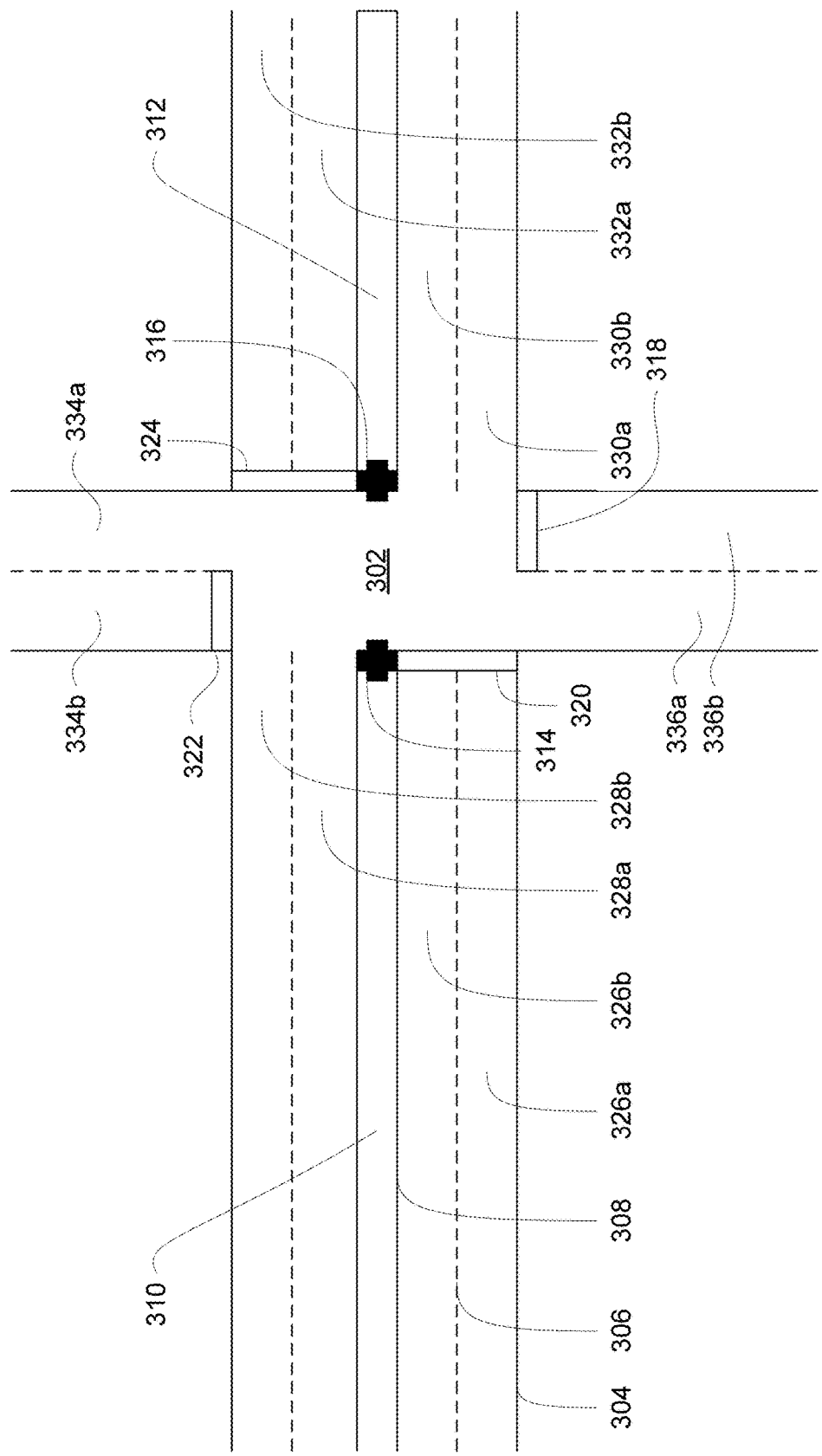
FIGS. 3A-B illustrates exemplary map information in accordance with aspects of the technology.
Figure 3B:
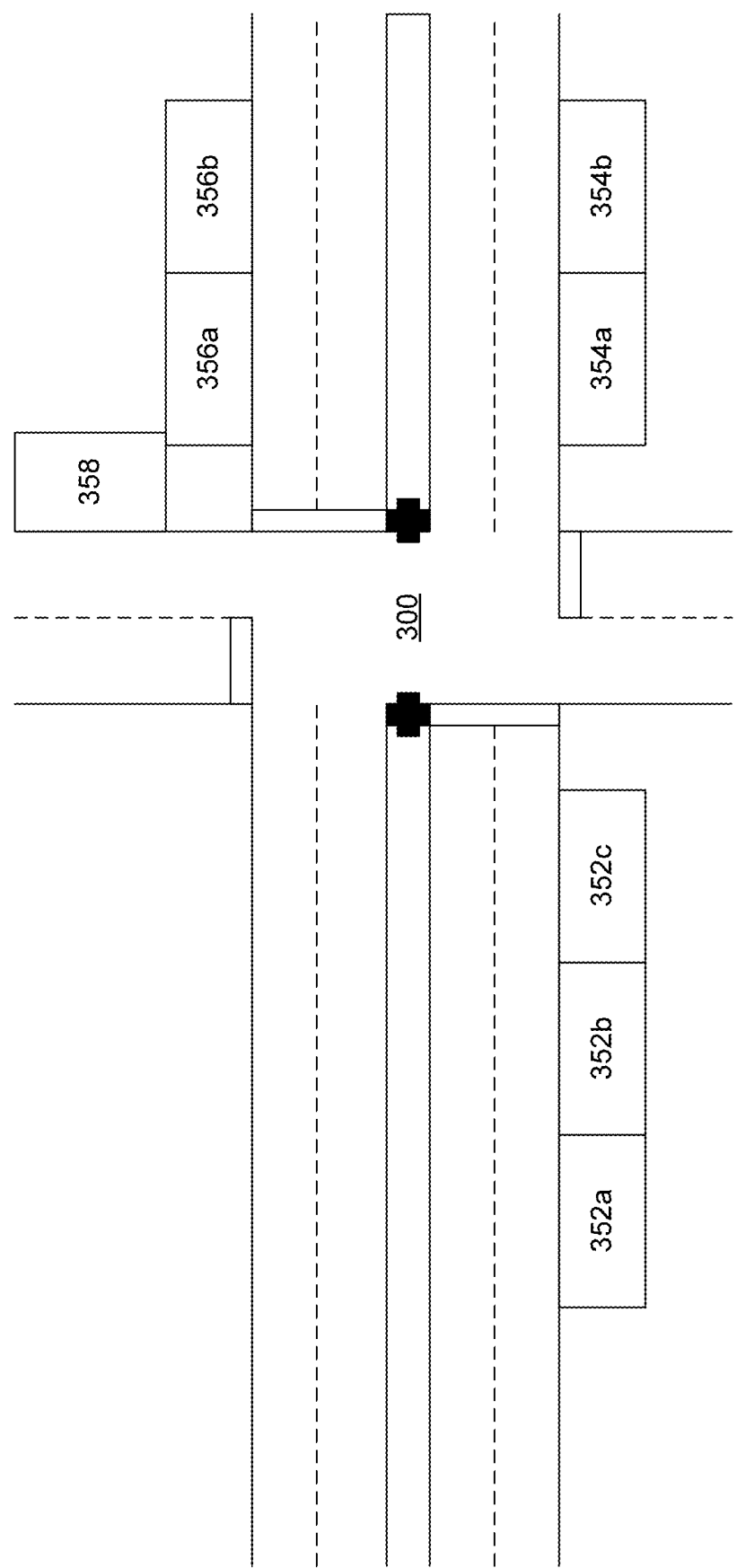

FIGS. 3A-B illustrate an example 300 of map information for a section of roadway including intersection 302. FIG. 3A depicts certain map information that includes information identifying the shape, location, and other characteristics of lane markers or lane lines 304, 306, 308, median areas 310, 312, traffic signals 314, 316, as well as stop lines 318, 320, 322, 324. The lane lines may also define various lanes (e.g., 326a-b, 328a-b, 330a-b, 332a-b, 334a-b and 336a-b) or these lanes may also be explicitly identified in the map information. In addition to these features, the map information may also include information that identifies the direction of traffic, speed limits for each lane, as well as information that allows the system to determine whether the vehicle has the right of way to complete a particular maneuver (e.g., complete a turn, change lanes, cross a lane of traffic or proceed through an intersection), as well as other features such as curbs, buildings, waterways, vegetation, signs, etc.

The map information may identify pullover locations, which may include one or more areas where a vehicle is able to stop and to pick up or drop off passengers or packages (or other cargo). These areas may correspond to parking spaces, waiting areas, shoulders, parking lots, etc. For instance, FIG. 3B depicts a view 350 showing parking areas 352-358 adjacent to different portions of the roadway. In particular, in this view the parking areas 352*a*-*c* are adjacent to lane 326*a*, parking areas 354*a*-*b* are adjacent to lane 330*a*, parking areas 356*a*-*b* are adjacent to lane 332*b*, and parking area 358 is adjacent to lane 334*a*).

In one scenario, these pullover locations may correspond to parking spaces, but in other scenarios such locations may correspond to any type of area in which a vehicle is able to stop to pick up and drop off passengers or cargo, such as a loading zone or painted curb region designated for certain stopping activities. The pullover locations may be associated with time of day, holiday, street sweeping or other regulations that may limit when pickups or drop offs may be performed. The predetermined pullover locations may be determined using heuristics, such as every 1 meter (or more or less). This information may be updated periodically, for instance every week (or more or less), based on locations where vehicles of the fleet or other vehicles are observed being stopped or pulled over.

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. In this situation, each edge may be defined by a starting graph node having a specific geographic location (e.g., latitude, longitude, altitude, etc.), an ending graph node having a specific geographic location (e.g., latitude, longitude, altitude, etc.), and a direction. This direction may refer to a direction the vehicle must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

As noted above, information about the vehicle's status may be shared with a rider, a person awaiting pickup or delivery of a package, or other user. This may include, for instance, displaying the vehicle's up to date location, status and route to the rider (or other user) on the map so that they can plan ahead on how to exit (or enter) the vehicle. FIG. 4 illustrates an example 400 in which a client device such as a mobile phone 402 displays certain trip status information to a user awaiting pickup. As shown, the graphical interface (GUI) presents a map 404 with the vehicle 406 and callout 408, such as a stop light icon to indicate that the vehicle is currently waiting at a traffic signal. The GUI may also indicate the current route to pickup location 410 via a dashed line 412. Text or other information 414 may also provide additional details, such as the amount of time until pickup, the expected pickup time, etc.

In one implementation, the information transmitted to the user's personal device originates from the vehicle. For instance, the pickup/drop off location and current trip status may be identified by the planner module or other part of the onboard processing system. This information may be communicated directly (e.g., via a WiFi, Bluetooth or the like) or routed through a remote server (e.g., via a cellular communication link), for instance as part of a fleet management system (see, e.g., FIGS. 15A-B, which are discussed further below). In one scenario, the server would decide whether to message the user and how to message the user. In another scenario, the vehicle and the server both transmit status information to the user's device. This may be done in collaboration between the vehicle and the server, or independently. For instance, the vehicle may provide one set of information regarding what the vehicle detects in its environment from its onboard perception system and how it is responding to what it detects, while the server may provide another set of information, such as traffic status farther along the route or other contextual data. In these scenarios, the software (e.g., app) running on the user's device may be configured to select what information to show, and when to show it, based on the received data. One or both of the vehicle or the server may select different communication strategies based on the pickup status of the user (i.e., awaiting pickup or picked up and in the vehicle). Alternatively or additionally, or the app or other program on the user's device may select different communication strategies. This may be based on the pickup status, the type(s) of information received, etc.

Figure 5A:
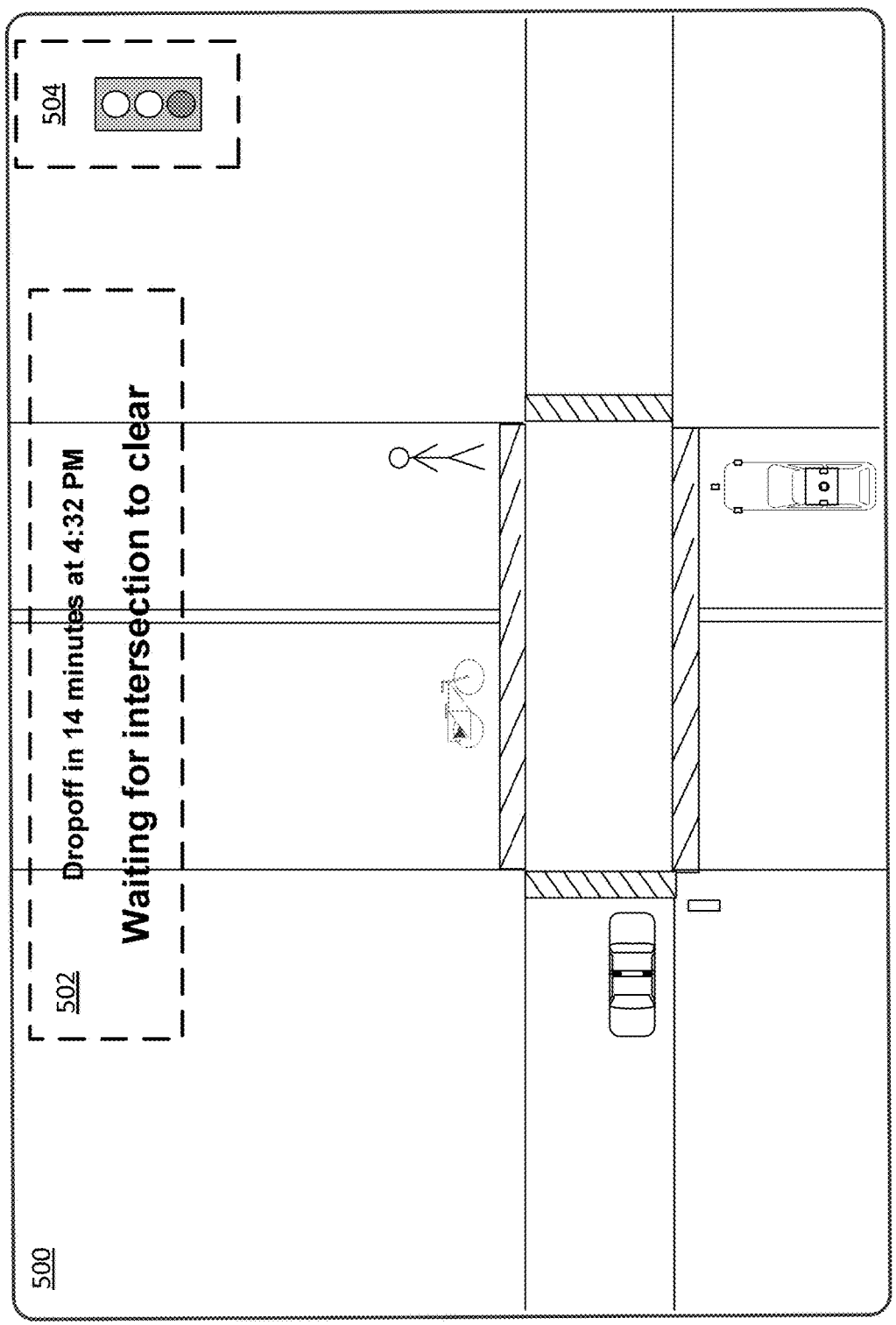
FIGS. 5A-D illustrate examples of different message presentations to riders or other users in accordance with aspects of the technology.
Figure 5B:
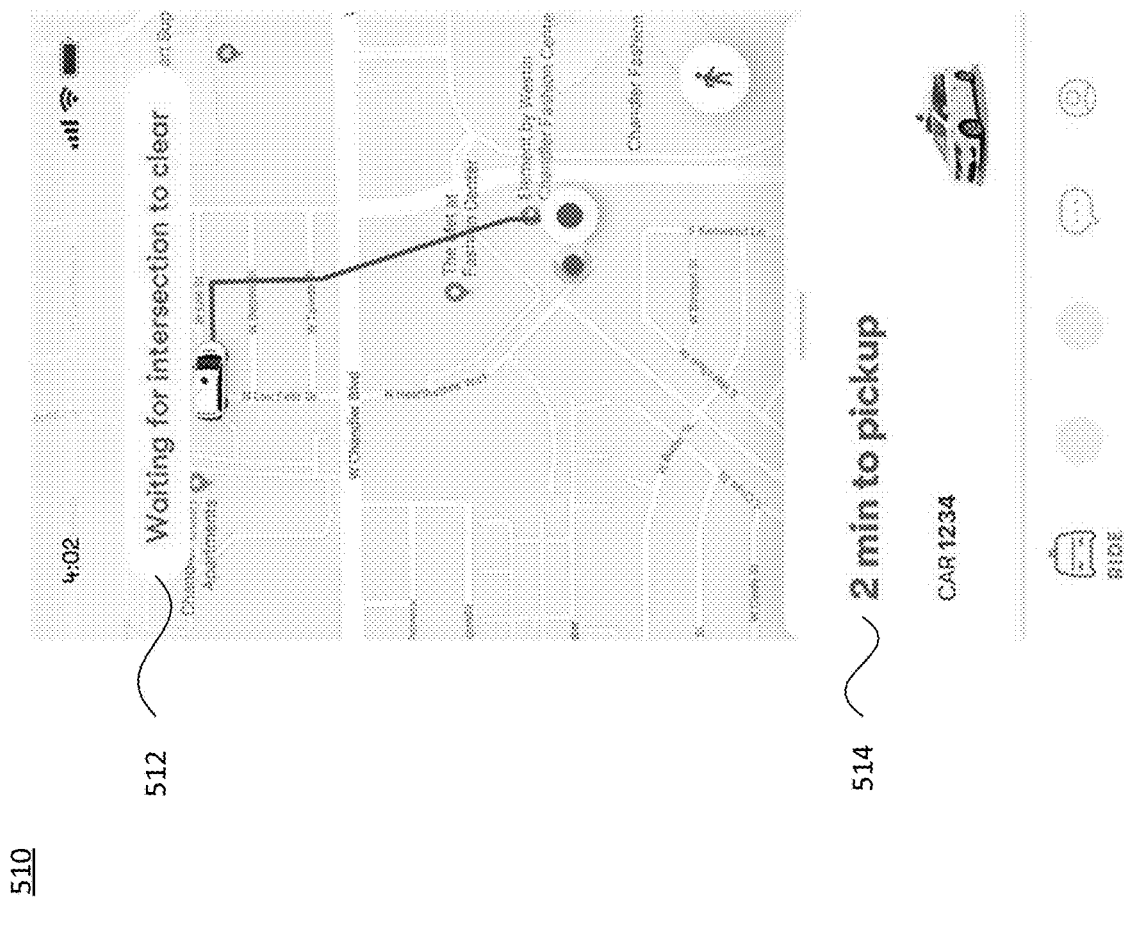
Figure 5D:
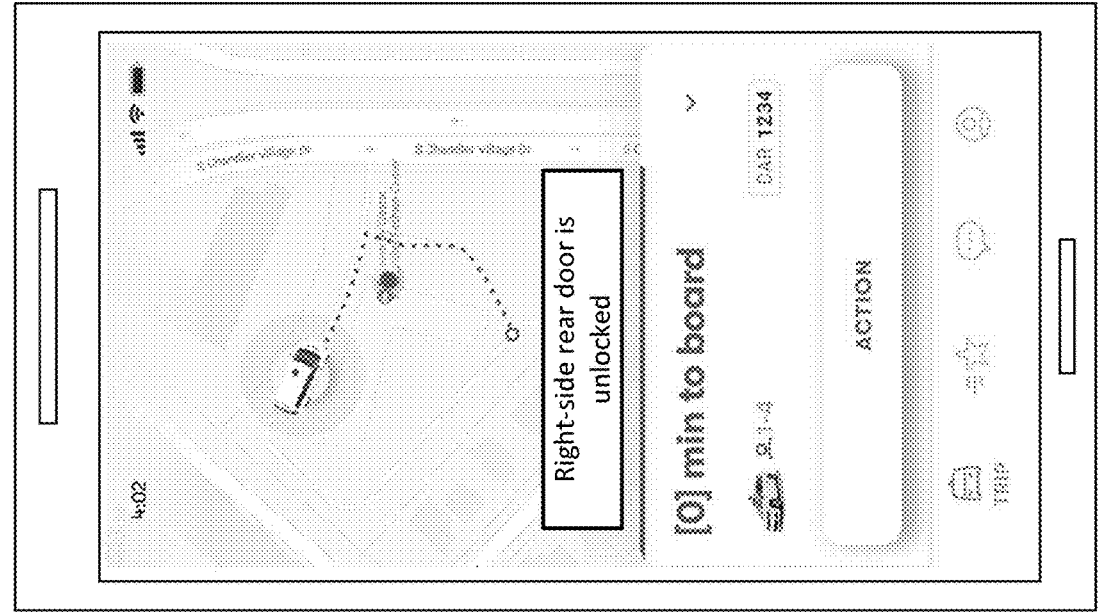
Figure 5C:
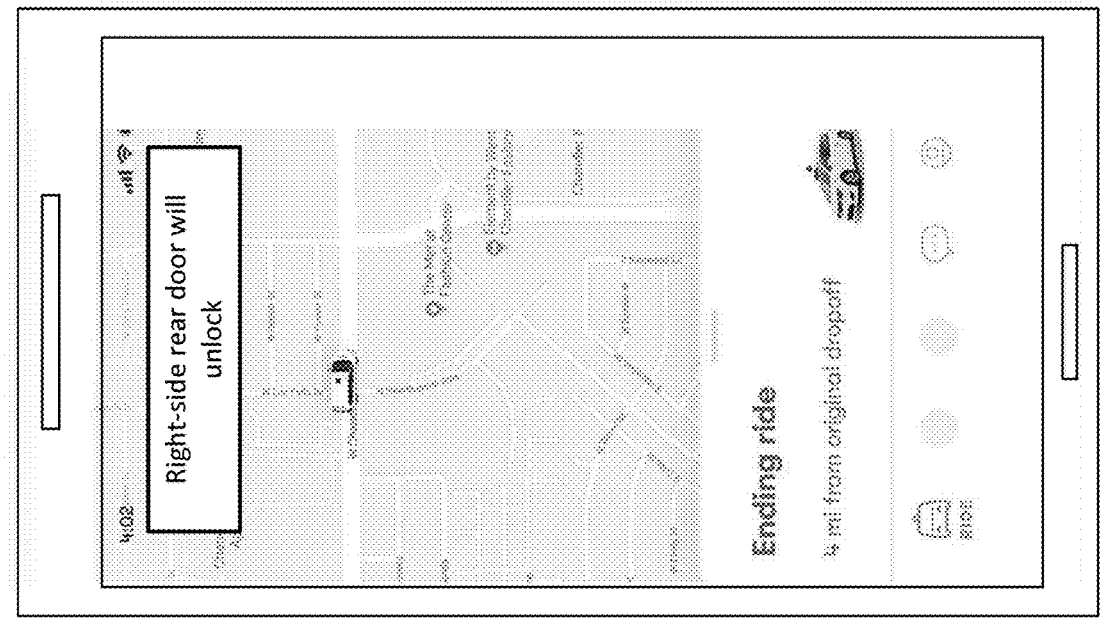

FIGS. 5A-D illustrate examples of how the vehicle may communicate a message about its status to a rider or other user. For instance, the message to the user (on the in-vehicle display 500 of FIG. 5A and the app 510 on the user's device in FIG. 5B) is "Waiting for intersection to clear". In the example of FIG. 5A, the message may be presented in a selected region 502 of the display as illustrated by the dashed box. The reason why the vehicle is waiting may be illustrated in this or another region, e.g., region 504 (which shows a traffic light icon), also illustrated by a dashed box. In this example, even though the light may be green, there may be pedestrians, bicyclists or other objects in the intersection. In contrast, while the message in FIG. 5B is also presented in a selected region 512 of the GUI by the app, in this case the reason (e.g., a traffic light or stop sign) may be omitted. Here, the vehicle's onboard system may select different information to present to the user to be picked up that is more relevant. For instance, as shown the app may inform the user in region 514 that he or she will be picked up in two minutes. By way of example, the onboard system may evaluate the time and/or distance until pickup when selecting whether to present icons, text, audible information or other data to the user, and choose certain data based on a ranked list of predicted importance to the recipient. Thus, in this case the system may rank (i) a message with the time until pickup, (ii) an icon indicating a present action or condition of the vehicle (e.g., waiting at a stop light, stop sign, yield sign, etc.), (iii) pickup location information, and the like, and select a subset of the ranked information for transmission to the user's device for presentation to the user. FIG. 5C illustrates an example 520 of information presented on the user's device when the ride is ending. Here, the information indicates that the right side rear door will unlock when the vehicle comes to a stop. And in example 530 of FIG. 5D, the display indicates to the rider that the right side rear door is unlocked.

Thus, based on the information presented, a user awaiting pickup viewing the displayed map may be able to readily recognize whether he or she needs to cross the street, or move to where the car, bus or other vehicle is likely to find parking along the route. And a rider within the vehicle may identify that they should exit via either the left or right passenger door, depending on the side of the road where the pull over may occur, traffic conditions, etc.

Various information may be evaluated by the onboard system to determine a level of uncertainty for the pickup or drop off spot, zone or other area. This information may be obtained from a variety of sources including the vehicle's perception system, the vehicle's route planner, a machine-learning based detection module that analyzes objects detected in the vehicle's environment, a remote assistance service, etc. By way of example, the control system may include a module that receives ("listens" to) a variety of inputs and then transforms the input information into a user interface that provides meaningful contextualized details regarding pickup or drop off.

For instance, one set of inputs may be produced by the perception system, such as detection of traffic lights, signage, locations and density or congestion of other road users, weather information, road and sidewalk conditions (e.g., wet, icy or the presence of puddles along an area of disembarkation), etc. Another set of inputs may be produced by a navigation or mapping system in response to prestored or detected information. This can include extracting information encoded in an electronic map (e.g., whether an upcoming area alongside a road segment is a permanently or temporally limited no parking zone, or something that is dynamically detected by the perception system such as an active construction zone). And another set of inputs may include navigation decisions or other route planning actions. Here, for instance, the onboard system may determine when the vehicle is unable to immediately pull over (e.g., due to gridlock).

The various inputs from different onboard systems can thus be used to generate messages in real time about various conditions and situations, and such information can be presented to the user. In addition to these examples, the vehicle may also communicate other information such as the route generated by the on-board planner module, whether the vehicle missed a turn and needs to adjust the route, etc. In one example, the app may enable the user to tap the screen or otherwise query (e.g., via an audible question or hand gesture) for more details about the vehicle's status or related information. In another example, the vehicle's sensors may detect another vehicle in a loading/unloading zone. It may not be immediately apparent whether the other vehicle is going to be there for a while or will leave shortly. However, if the other vehicle's hazard lights are detected to be flashing, the vehicle's onboard system may determine that the other vehicle will be in the zone for a minimum amount of time. In this case, when the minimum amount of time would coincide with the vehicle's pickup or drop off action, the vehicle can communicate to a rider or customer awaiting pickup that the vehicle will try to find another spot to pull over. In this situation, the vehicle may contact remote assistance to get a decision on how best to proceed.

In view of this, aspects of the technology involve communicating the reachability status of a location of interest by a self-driving vehicle to users, including riders within the vehicle, users awaiting pickup, or customers that have scheduled for pickup or drop off of packages or other cargo. In addition or alternative to presenting current trip status and routing details, the user interface is configured to provide up to date pickup and/or drop off information to riders or others users of a vehicle operating in an autonomous driving mode. As noted above, this may include indicating how much variance (e.g., uncertainty) there may be about the specific location based on congestion, parking or idling regulations, weather conditions, etc.

In particular, visualization tools are presentable to a user on the display of his/her personal device, such as a mobile phone, smart watch, tablet PC, etc., to indicate the uncertainty and/or likely final pickup or drop off location. According to one aspect, presenting such contextual information may be done based on real time information (e.g., what the perception system of the vehicle detects as it approaches the selected location), as well as in view of historical information about the location of interest. Historical data may be used to reduce an amount of uncertainty in the location, or to otherwise narrow down a set of possible locations to complete the pickup or drop off. Changes may be presented to the user when more current information is available, or when the user is interacting with the user interface. Providing this information on a real time basis as needed, according to in information available to the vehicle (or a back-end fleet management system) may reduce confusion and set realistic user expectations regarding the trip.

Figure 6A:
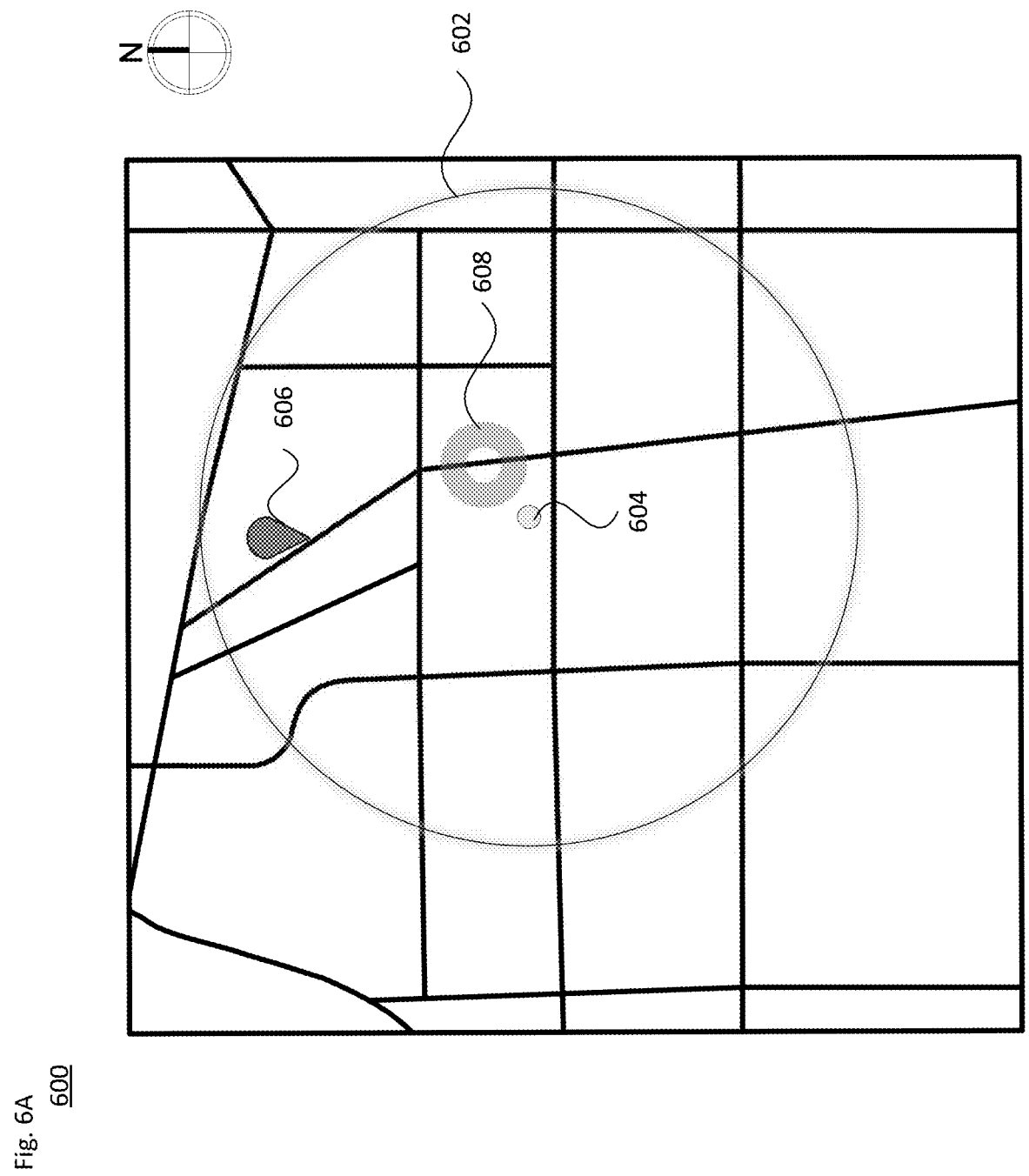
FIGS. 6A-C illustrate an example of changing a pickup or drop off location in response to user input in accordance with aspects of the technology.
Figure 6B:
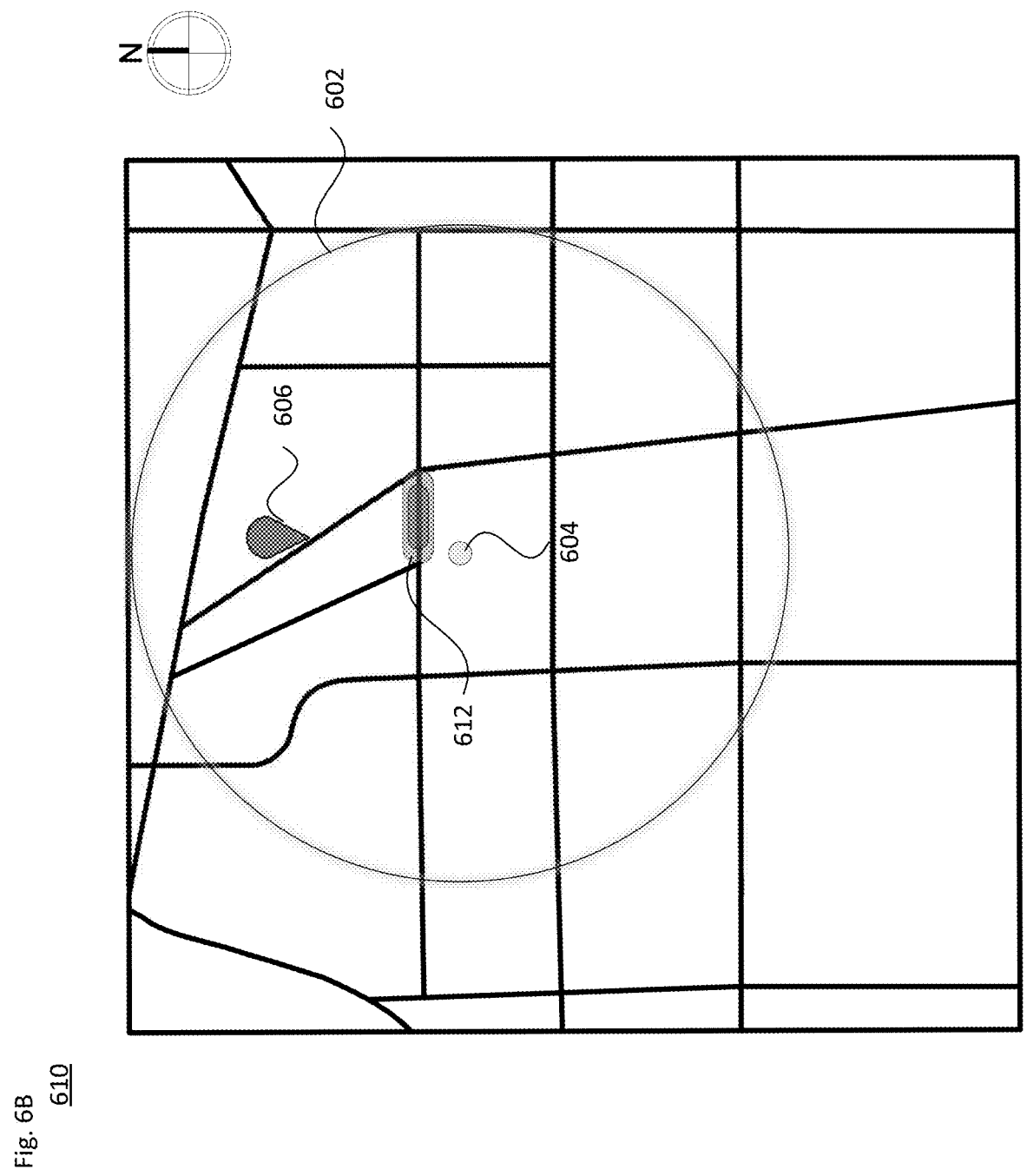
Figure 6C:
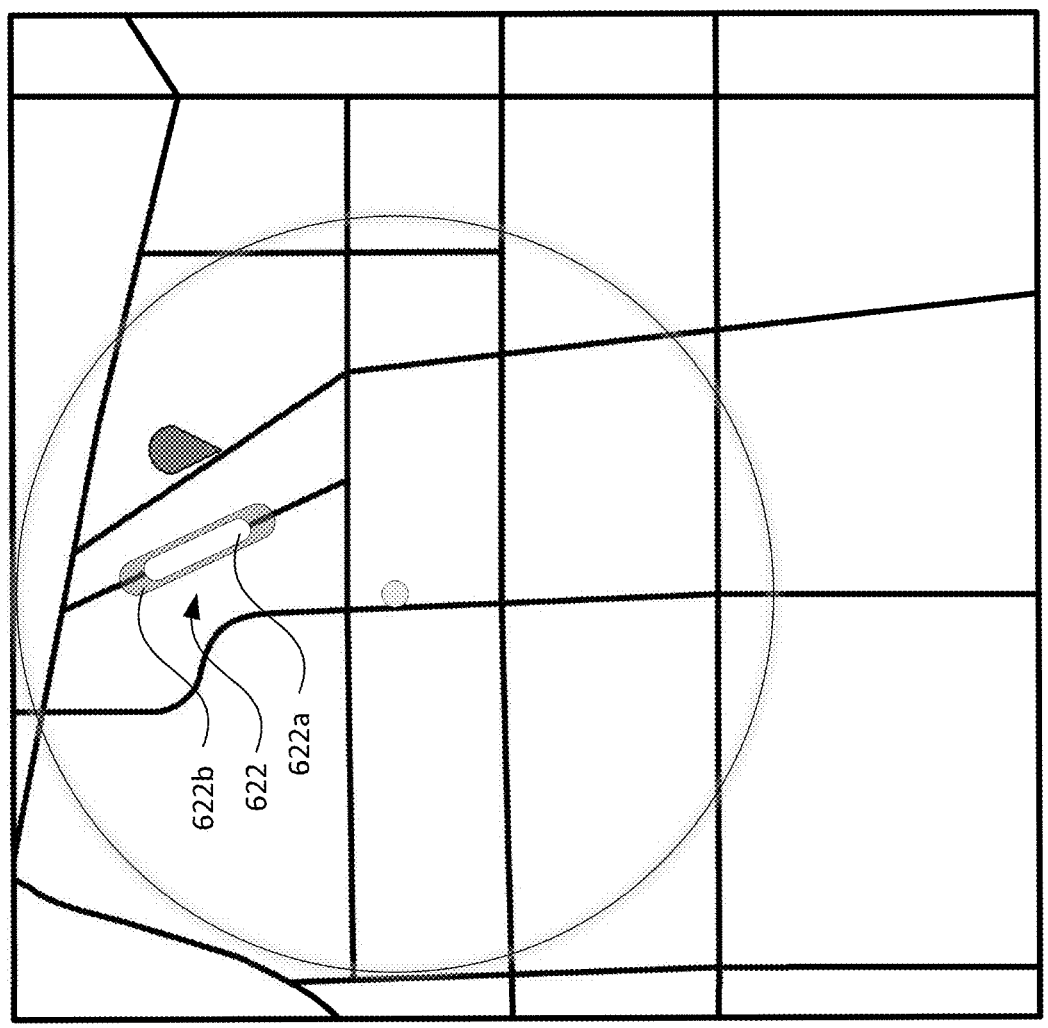

FIGS. 6A-C illustrate a scenario in which a pickup or drop off location may be changed in response to user interaction with the user interface. For instance, when requesting a trip, a customer or other user may use an app on their device to communicate with a self-driving vehicle or a back-end ride or delivery service. This can include selecting the pickup and/or drop off location, for example by dropping a pin or other marker in a graphical interface via an app of the device to identify a location for the pickup or drop off.

FIG. 6A illustrates a first view 600 of a map that is displayable on the user interface via the app. As shown in this example, a viewfinder element 602 (e.g., a lens or magnifying glass-type graphical element) having a center 604 may be moved around the map in response to input by the user. A location of interest 606 is shown in the upper middle region of the viewfinder element 602. In this example, the location of interest 606 may be set, e.g., based on a trip request from the user or on the location of a package delivery. In this first view, a pickup or drop off location identifier 608 may be presented to the user as a single spot along a generally north-south street based on an initial determination by the vehicle (or back-end system). As the user moves the viewfinder element 602 via the user interface (e.g., a touch, swipe or gesture), the pickup or drop off location may change. For example, the location or zone for pickup or drop off may snap to particular area, such as a portion of roadway or a sidewalk.

For instance, as shown in view 610 of FIG. 6B, moving the center 604 of the viewfinder element 602 upward (e.g., northward), the location changes to pickup or drop off location identifier 612, which is shown on a different (e.g., east-west) street than location 608. As shown here, the visualization of the location changes from a circular shape associated with a single spot to an elongated bar that may correspond to an embarkation or disembarkation zone. In this example, the size (e.g., width or length) of the location identifier 612 spans the distance between two cross streets. As the viewfinder element is panned toward the left (westward) in view 620 of FIG. 6C, the location changes again. As shown in this figure, pickup or drop off location identifier 622 is positioned along yet another street (e.g., generally northwest-southeast), and has a different size than the location 612. Thus, the location identifier may change position and appearance, e.g., to "snap to" a road segment.

As noted above, there may be some variance or uncertainty associated with the pickup or drop off location. This may be due to one or more factors, including traffic congestion, regulations (e.g., temporal-based restrictions) against parking or idling, weather conditions (e.g., an icy sidewalk, a large puddle along the street adjacent to the curb, etc.) and/or other factors. Thus, as shown by location identifiers 612 and 622 the elongated bar indicates a region where pickup or drop off may be possible. Furthermore, as shown by location elements 622a (e.g., an inner zone) and 622b (e.g., an outer zone), different parts of the region may be emphasized by shading, highlighting, color, a gradient, etc., to provide an indicia to the user that one part of the region (e.g., 622a) is a more likely pickup or drop off location than another part of the region (e.g., 622b).

Different visualizations may be used to indicated the general size or location of a pickup or drop off region. For instance, FIGS. 7A-C illustrate exemplary static or pulsing circular zones. In particular, FIG. 7A illustrates a first view 700, in which a central area 702 is darker than concentric middle area 704, which in turn is darker than concentric outer area 706. A dashed line is presented to indicate an outer border, which may be omitted. FIG. 7B illustrates a second view 710, in which a central area 712 is darker than concentric middle area 714, which in turn is darker than encircling outer area 716. And FIG. 7C illustrates a third view 720, in which a central area 722 is darker than encircling outer area 724. By way of example, the gradient of color or shading is used to indicate a confidence difference in the pickup or drop off location within the dashed outer border. For instance, a higher confidence (e.g., on the order of 75%-99%) may be in the inner area 702, 712 or 722. A middle level of confidence (e.g., on the order of 40%-75%) may be in the middle area 704 or 714. And a low level of confidence (e.g., on the order of 5%-40%) may be in the outer area 706, 716 or 724. In one scenario, the gradient may be static or persistent on the display, while in another scenario the image presented to the user may change between any combination of FIGS. 7A-C, such as via a sequence of images or a pulsing action. While the gradients are shown as concentric rings and/or circular areas, in other examples the gradients may not be uniform or contiguous (e.g., such as in a heat map type representation).

Another visualization scenario is shown in FIGS. 8A-E. Here, views 800-840 illustrate an elongated bar that may be aligned along a section of a roadway or sidewalk to indicate a pickup or drop off zone. As shown in these views, a color difference or gradient may be used to indicate information about the zone. For instance, in one example, the elongated bar sequentially changes appearance between two or more of the views 800-840, such as between 800-840 all in order, one or more times. This can be done to give the user a sense for the relative size of the zone along the road or sidewalk. The intensity and/or gradient may also indicate an overall confidence that this zone will be where pickup or drop off will occur. For instance, a darker (or lighter) overall color intensity, or a minimal gradient, may indicate a higher level of confidence (e.g., on the order of 60%-95%), while a lighter (or darker) overall color intensity, or a pronounced gradient, may indicate a lower level of confidence (e.g., on the order of 25%-60%).

Yet another visualization scenario is shown in FIGS. 9A-E. Here, views 900-940 illustrate an elongated, rounded bar that may be aligned along a section of a roadway or sidewalk to indicate a pickup or drop off zone. As shown in these views, a small circular or other geometric element may be used indicate information about the zone, for instance giving the appearance of traveling along the length of the bar in the different views. The speed of travel within the bar and/or the visual distinctiveness between the circular element and the bar may also indicate an overall confidence that this zone will be where pickup or drop off will occur. For instance, a slower speed of travel (e.g., traversing the length every 3-5 seconds), or a minimal visual difference in color (e.g., olive green versus light green), may indicate a lower level of confidence (e.g., on the order of 20%-55%), while a faster speed of travel (e.g., traversing the length in less than 0.5-2 seconds), or a significant visual difference in color (e.g., navy blue versus turquoise, may indicate a higher level of confidence (e.g., on the order of 65%-85%). In one scenario, when the vehicle gets closer to the dropoff zone and has the real time data to understand the scene dynamics, the inner circular element may not travel the full length of the elongated bar. Instead, in this scenario the inner element may move only in the area of highest confidence within the larger bar.

A further visualization scenario is shown in FIGS. 10A-E. Here, views 1000-1040 illustrate one or more rounded bars that may be aligned along a section of a roadway or sidewalk to indicate a pickup or drop off zone. View 1000 of FIG. 10A presents a single small bar having a first color, shading or other appearance. View 1010 of FIG. 10B illustrates the small bar of FIG. 10A within a first medium-sized bar, which has a second color, shading or other appearance. View 1020 of FIG. 10C illustrates the small bar of FIG. 10A within a second medium-sized bar. View 1030 of FIG. 10D illustrates the small bar of FIG. 10A and second medium-sized bar of FIG. 10C within a first large-sized bar, which has a third color, shading or other appearance. And view 1040 of FIG. 10D illustrates the small bar of FIG. 10A and second medium-sized bar of FIG. 10C within a second large-sized bar that is bigger than the first large sized bar. In one example, the views may change sequentially between FIGS. 10A-10E to show expansion and an alteration of appearance of the bar(s).

The speed of change between these bar arrangements and/or the visual distinctiveness between the nested bars may also indicate an overall confidence that this zone will be where pickup or drop off will occur. For instance, a slower speed of change (e.g., expanding from FIG. 10A to FIG. 10E or collapsing from FIG. 10E to FIG. 10A every 2-6 seconds), or a minimal visual difference in color between the bars, may indicate a lower level of confidence (e.g., on the order of 10%-35%), while a faster speed of change (e.g., collapsing or expanding completely in less than 0.25-1.5 seconds), or a significant visual difference in color, may indicate a higher level of confidence (e.g., on the order of 50%-90%). In addition, the placement of the smallest nested bar may indicate a higher likelihood for the pickup or drop off location, while the placement of the mid-size or largest bar may indicate the overall possible pickup region.

FIGS. 11A-B illustrates another visualization, in which multiple indicia can be used to identify the likely pickup or drop off location. For instance, as shown in view 1100 of FIG. 11A, an elongated L-shaped bar 1102 may be used along a corner or portion of an intersection along a roadway. The bar 1102 may have a different geometric shape depending upon the region of interest, such as straight, triangular, arcuate, etc. Within the bar 1102 is an indicator 1104, such as a small circle or other geometric shape. This indicator can be used to visually represent to the rider or other user the most likely drop off or pickup point near the destination. And as shown, a marker, flag or other tag 1106 may point to the indicator 1104, and may include text, icons or other visual features (e.g., highlighting or coloring) to emphasize the location of the indicator 1104. For instance, the tag 1106 may display text stating "Dropoff Zone" (or Pickup Zone, etc.) and/or a time when the vehicle is expected to arrive at that location.

Furthermore, the bar 1102 may employ a color difference or gradient (e.g., as in FIGS. 8A-E) to indicate information about the zone or otherwise draw the user's attention. In one example, a color difference or gradient may include a first feature 1108 and a second feature 1110. As illustrated in view 1100 of FIG. 11A and view 1120 of FIG. 11B, the first and second features 1108, 1110 may morph, change places or otherwise interact—as can be seen by a transition from view 1100 to view 1120, or a transition from view 1120 to view 1100.

FIG. 11C illustrates yet another view 1130, which includes an arrow 1132 representing that the tag 1106 may move laterally, radially or otherwise away from and towards the bar 1102. This relative movement between different visual elements can accentuate the importance of the expected pickup or drop off location.

Figure 12A:
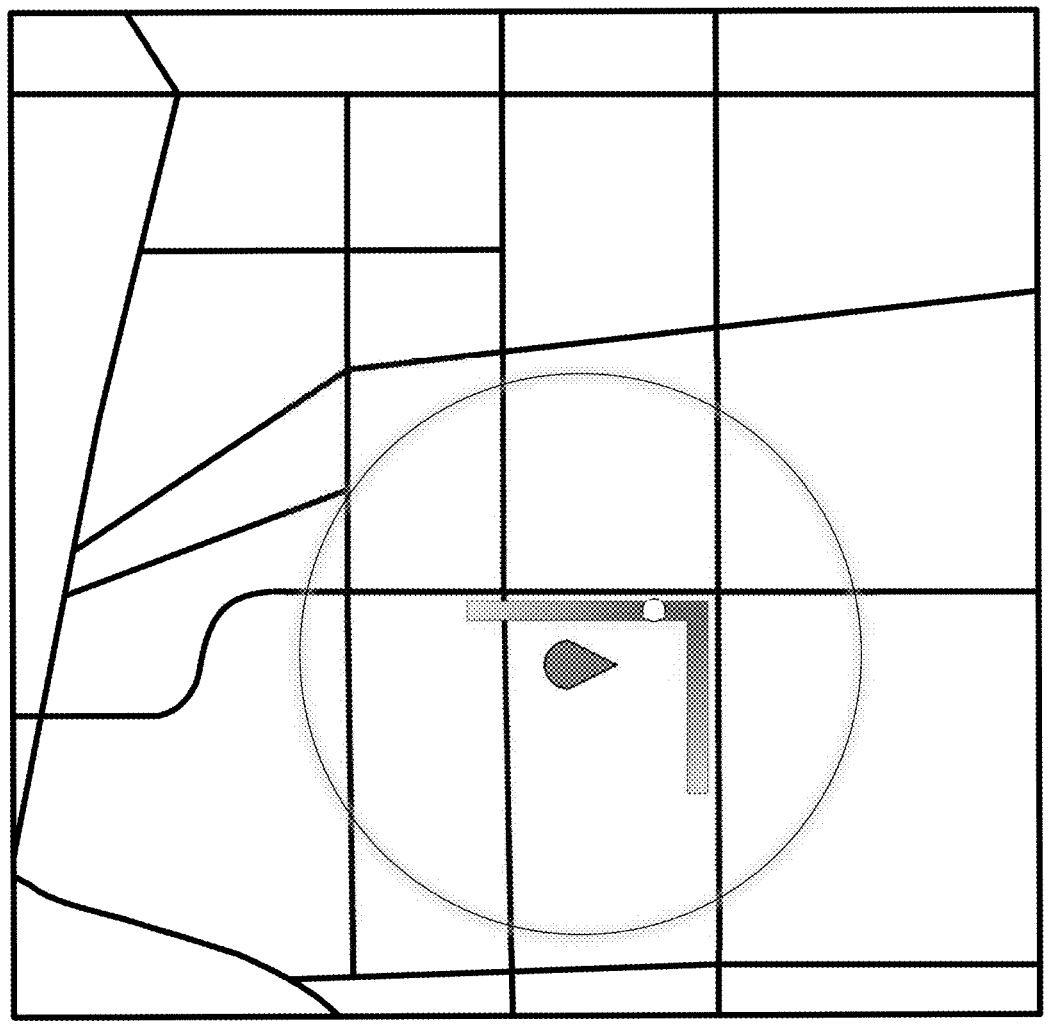
FIGS. 12A-B illustrate an example set of combined visualizations in accordance with aspects of the technology.
Figure 12B:
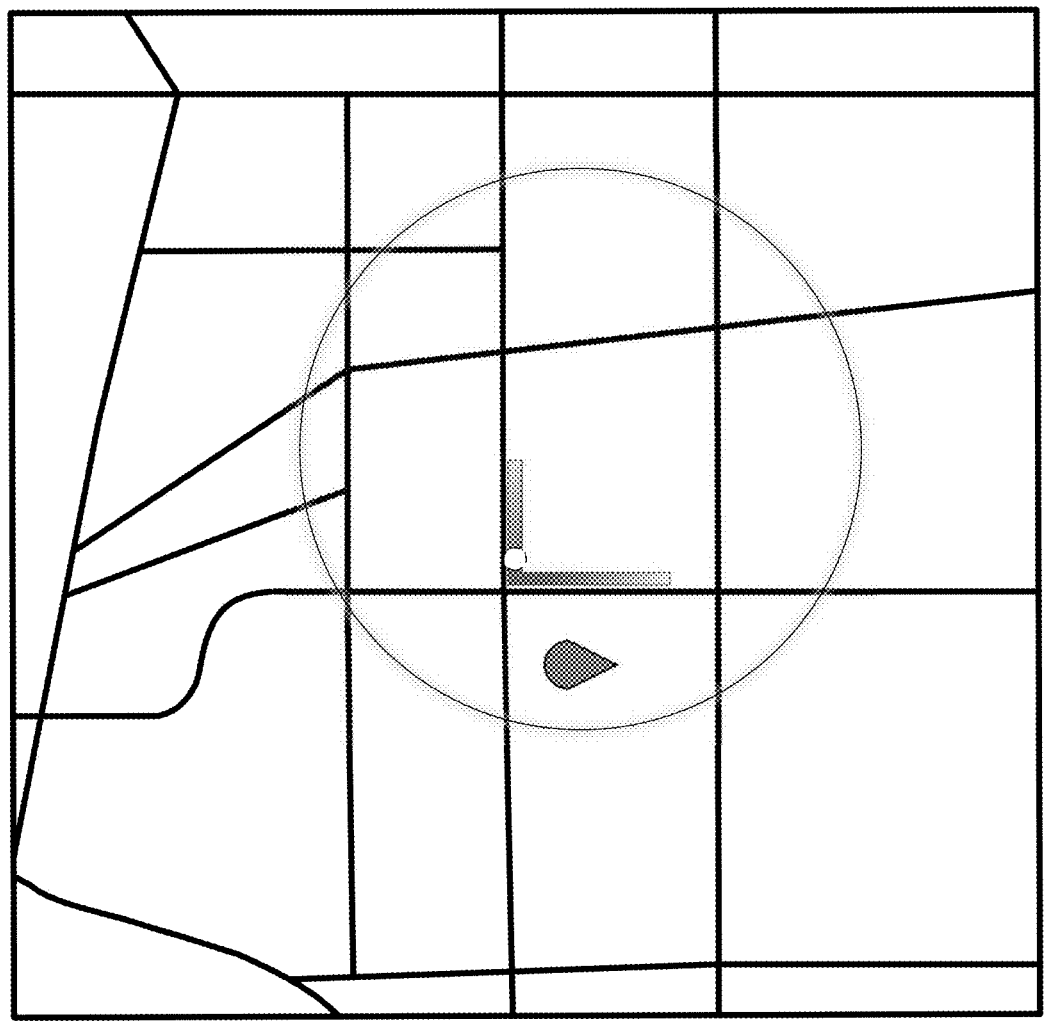

FIGS. 12A-B illustrate an example that includes a combination of visualizations in consideration of the above. As shown in view 1200 of FIG. 12A, a viewfinder element (e.g., viewfinder element 602 of FIG. 6A) may be presented in combination with the bar configuration of FIGS. 11A-B. As the viewfinder is moved as shown in view 1210 of FIG. 12B (e.g., to the right or eastward in this example), the size, orientation, etc. of the bar elements may change to indicate an updated pickup or drop off region relative to a location of interest (identified by a pushpin or balloon icon in this example).

Figure 13B:
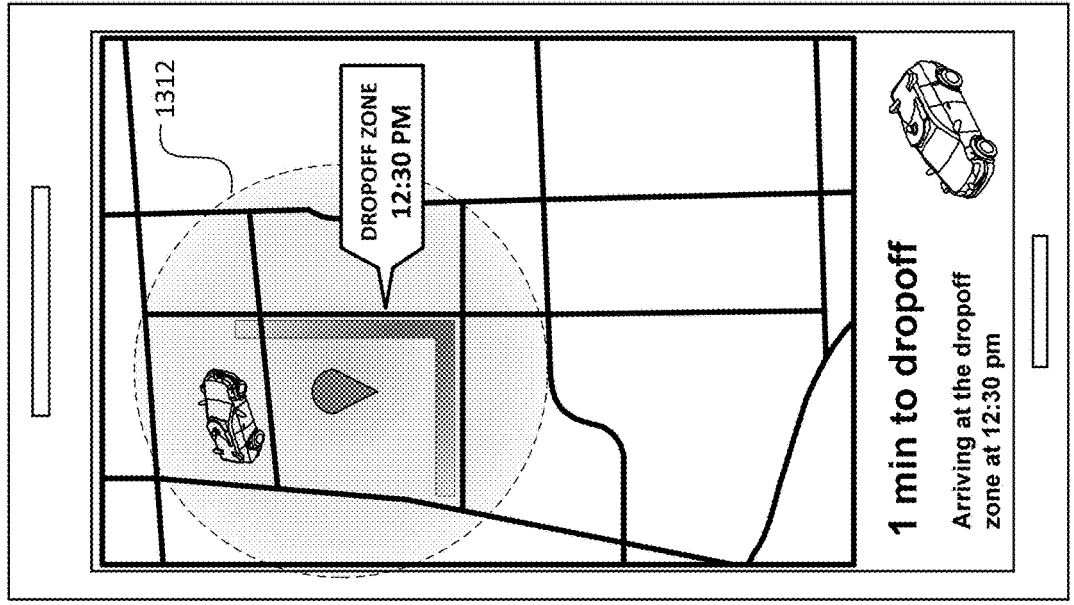
FIGS. 13A-B illustrate yet another example set of visualizations in accordance with aspects of the technology.
Figure 13A:
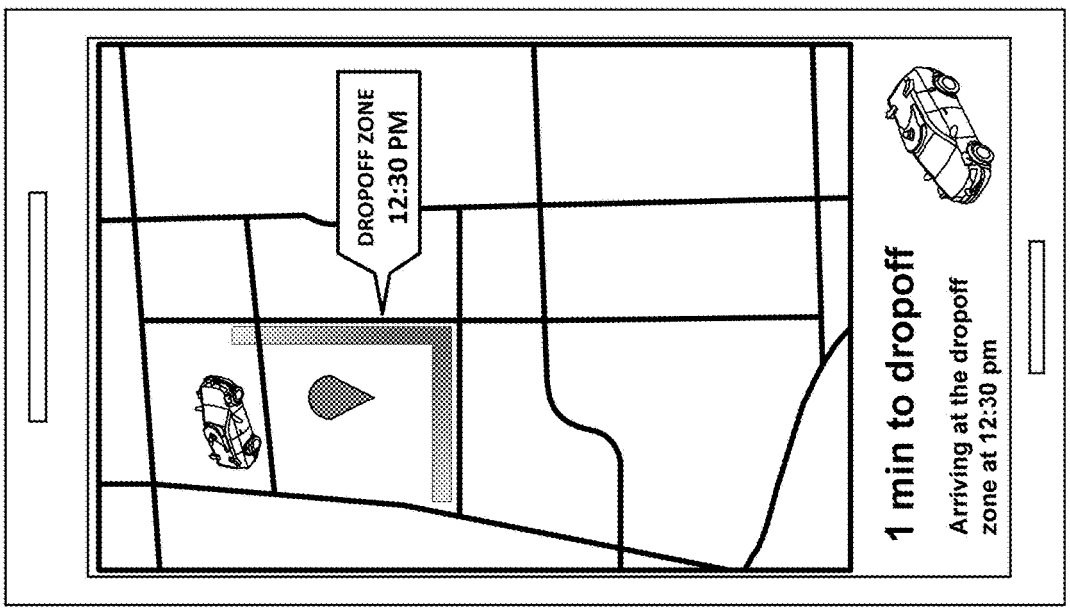

FIGS. 13A-B illustrate another example of visualizations presented on the graphical interface of a user device. In particular, FIG. 13A illustrates a map 1300 with the L-shaped bar and tag from FIGS. 11A-B, relative to a location of interest. And FIG. 13B illustrates another map 1310 with the L-shaped bar and tag, as well as a static or pulsing circular zone bounded by dashed line 1312, such as was shown in any of FIGS. 7A-C. Here, the shading of the circular zone may help complement the information of the bar and tag, to further draw the user's eye to the area around the location of interest.

Figure 14A:
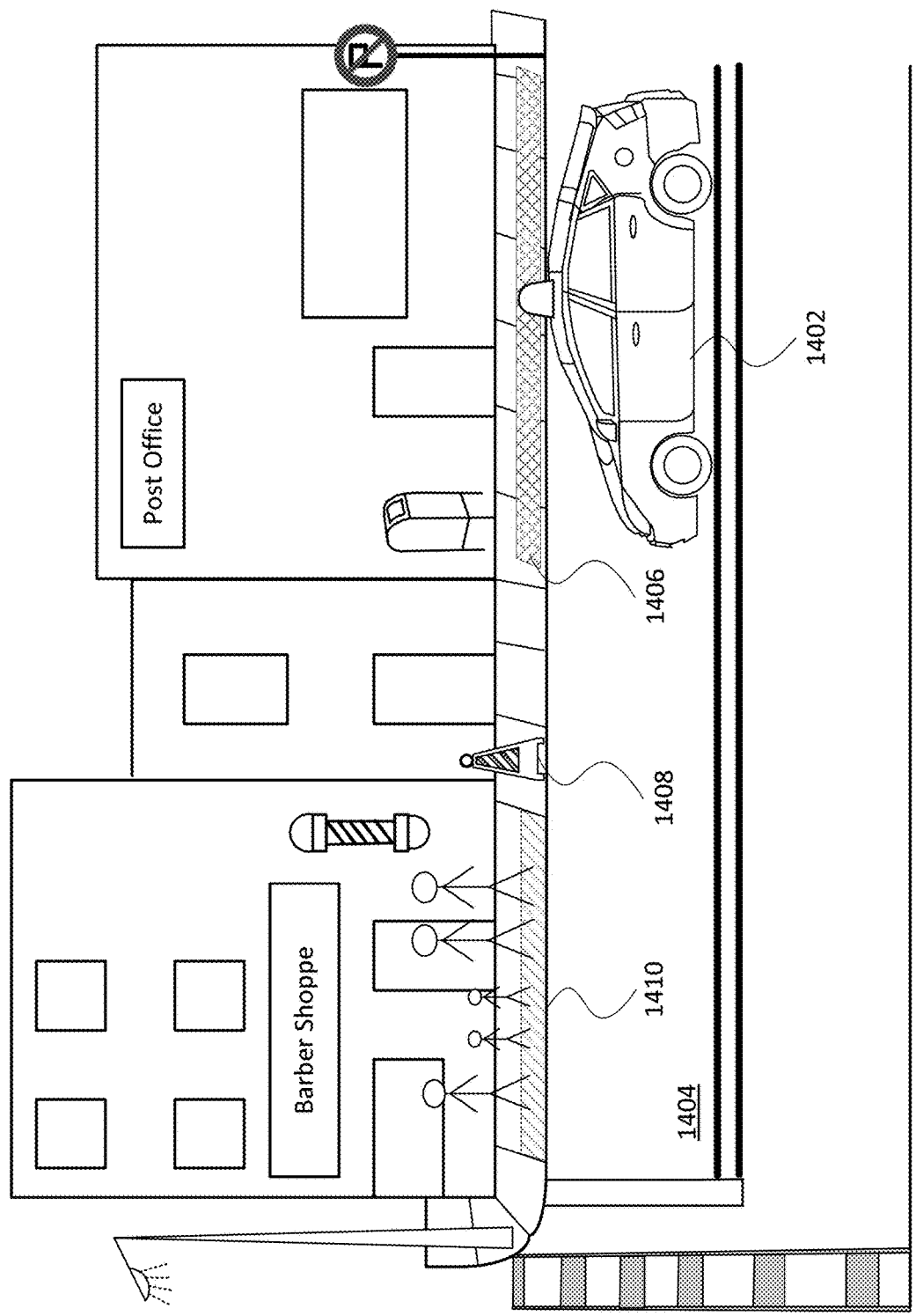
Figure 14D:
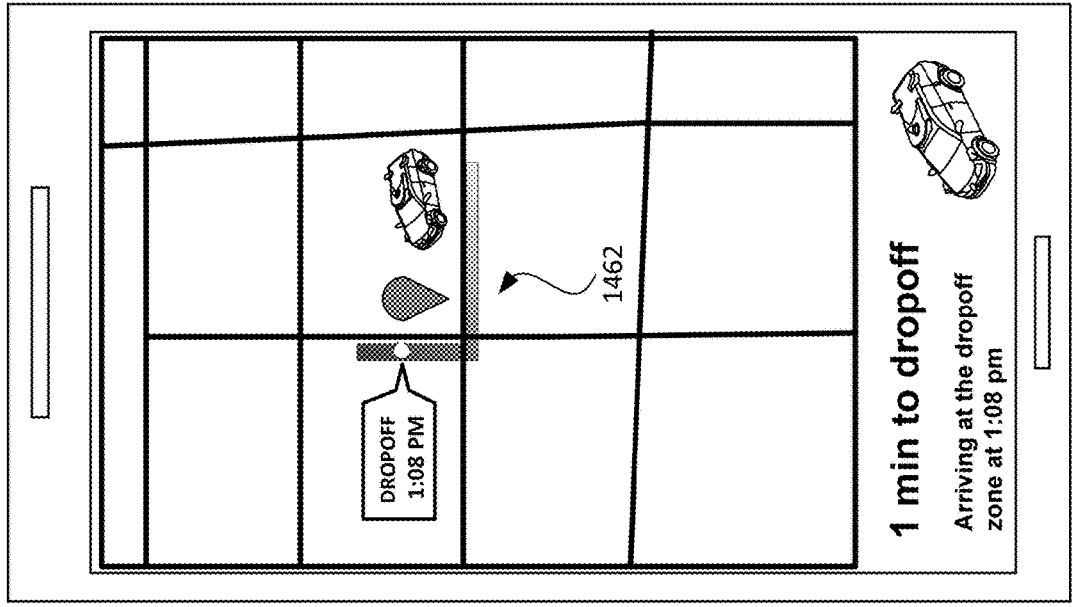
FIGS. 14C-D illustrate views of visualizations associated with FIGS. 14A-B in accordance with aspects of the technology.
Figure 14C:
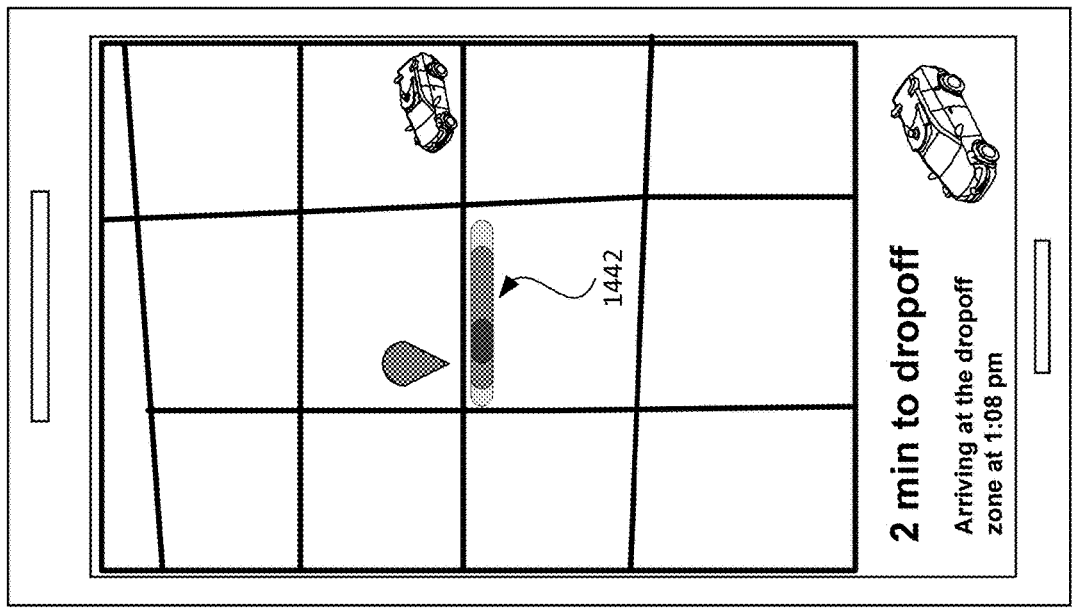

FIGS. 14A-B illustrate an example pickup or drop off scenario as seen from a street view level (view 1400 of FIG. 14A) and a bird's-eye view (view 1420 of FIG. 14B). In this example, assume that a rider has requested to be dropped off at the Barber Shoppe. The rider is a passenger in vehicle 1402, which is operating in an autonomous driving mode approaching the Barber Shoppe on road segment 1404. Initially, as shown in the app (view 1440 of FIG. 14C), a visualization 1442 is presented showing the most likely drop off location is along the street in front of the store. The visualization 1442 indicates a level of uncertainty about the drop off location, because it may not be clear at that point in time what exact location is optimal or available for dropping the rider off. In this example, the information used to determine the visualization and level of uncertainty may include stored map information indicating there is a no parking sign and a no parking zone 1406 in front of the Post Office. The vehicle may also receive information about a potential obstruction 1408 near the Barber Shoppe. In this example there is a 15-minute parking zone 1410 in front of the Barber Shoppe, which provides the highest degree of confidence for a drop off point (as seen by the smallest inner bar of the visualization 1442).

However, as the vehicle gets closer to the destination, it may detect, using its onboard perception system (e.g., via lidar point cloud data and/or camera imagery) that there is a crowd of people in front of the Barber Shoppe entrance (as shown in FIG. 14A), and that there is water, ice or some other substance 1422 on the sidewalk (as shown in FIG. 14B). Based on stored map data and/or other information, the vehicle may determine that there is another possible drop off zone 1424 along a portion of roadway 1426 around the corner. Based on this, the vehicle may modify the visualization in real time, as shown in view 1460 of FIG. 14D. For instance, the vehicle may send updated reachability information to the user's device, which updates the graphical display to indicate that a most likely drop off point (such as the location having the highest confidence) is around the corner from the Barber Shoppe entrance. Thus, it can be seen that a number of visualizations may be used alone or in combination based on any of the examples herein, in order to provide an enhanced reachability experience for the user.

For the app on a user device, the visualization may be presented in the form of a "car monologue" notification in addition to an updated dropoff (or pickup) location dot/area in the map. By way of example, both the callout bubble in the map (e.g., callout 1106) and the textual information in bottom card (e.g., "Arriving at the dropoff zone at 1:08 pm (see FIG. 14D) may also change the estimated time of arrival depending on scenario. In this case, the car route can also be updated to illustrate the new vehicle trajectory to the new dropoff location. The walking dot directions (see example 530 of FIG. 5D) may also update from new dropoff location towards final destination so the rider can navigate themselves after they leave the car.

Figure 15A:
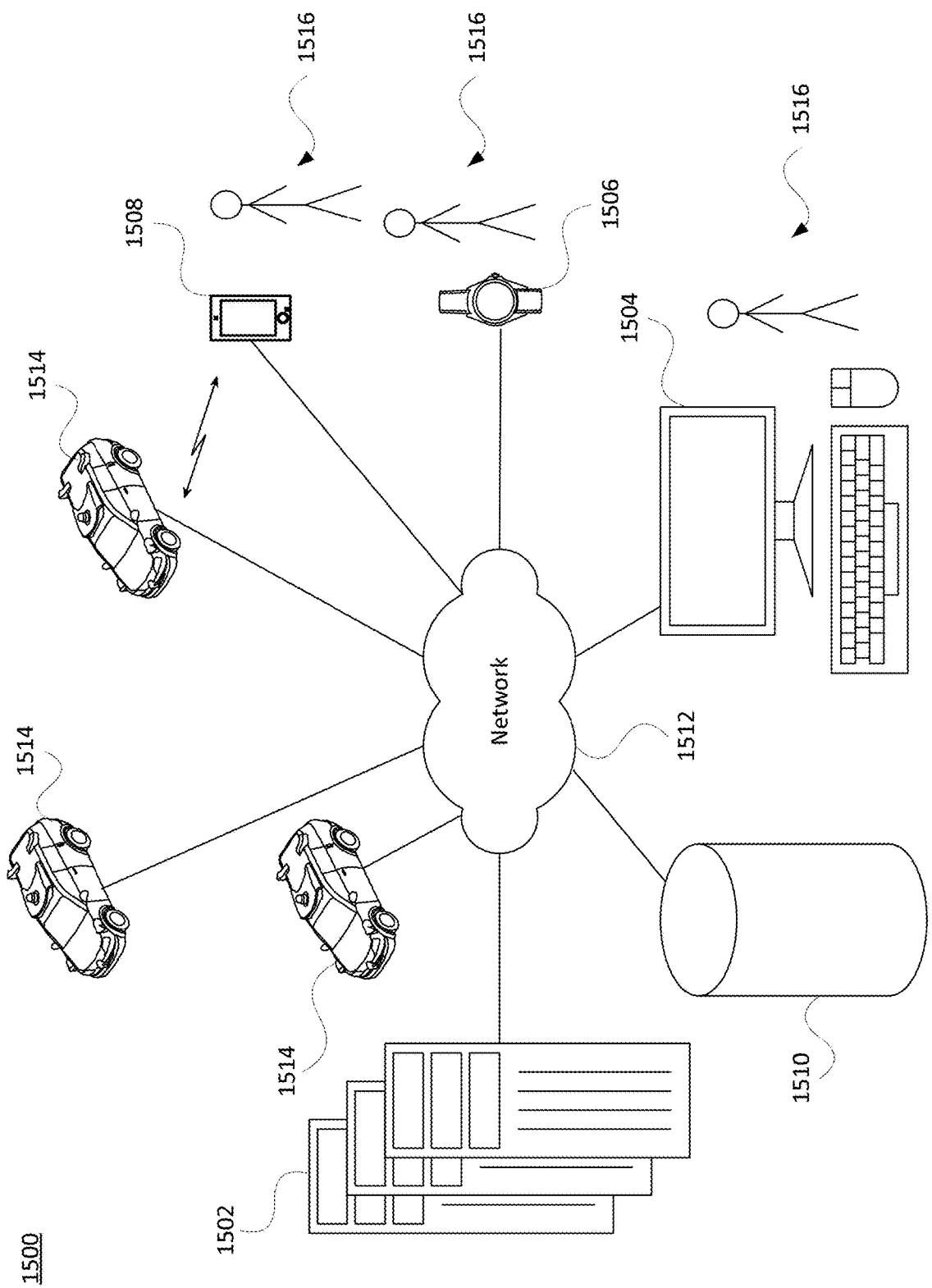
FIGS. 15A-B illustrate a system in accordance with aspects of the technology.
Figure 15B:
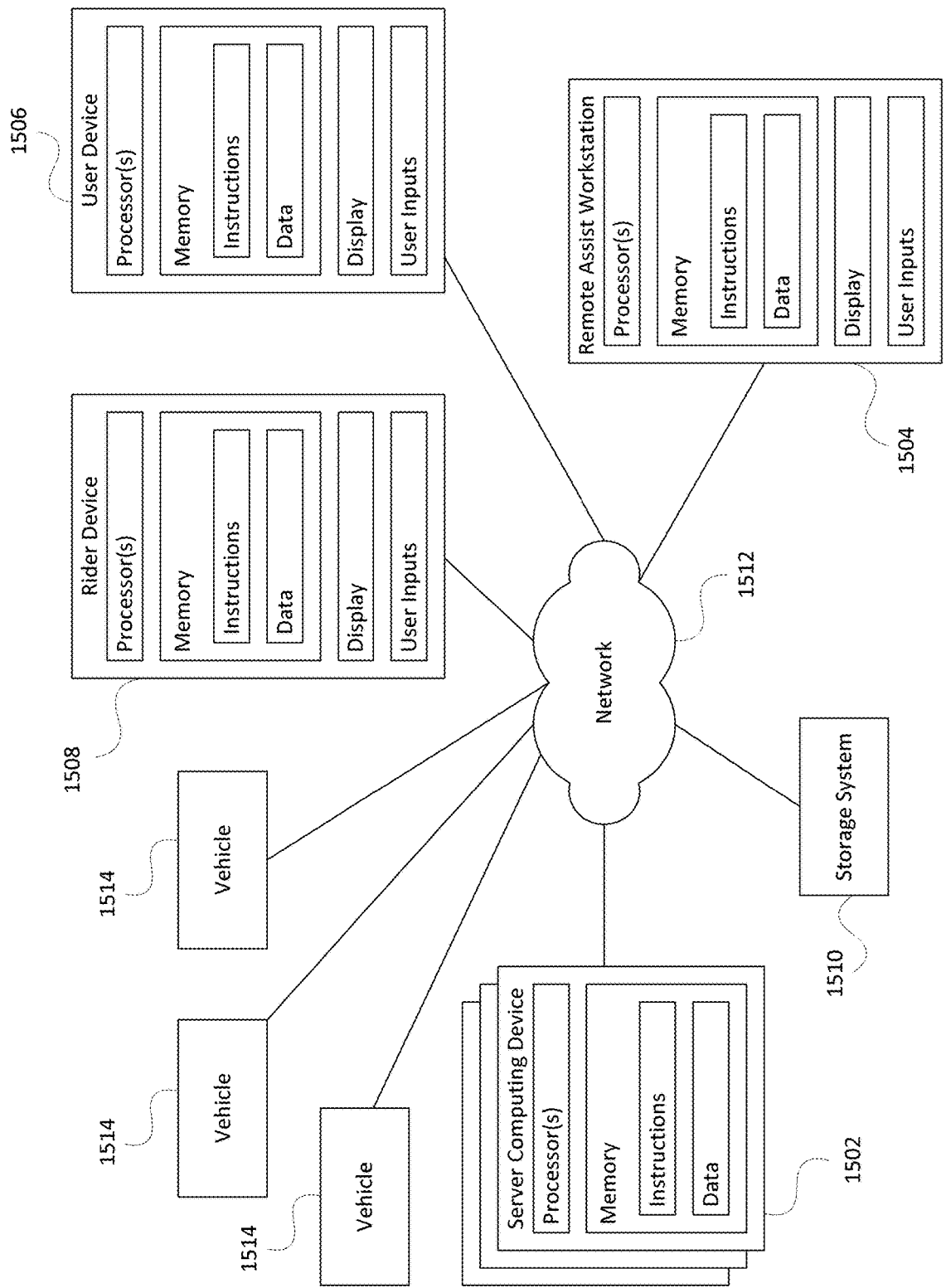

FIGS. 15A-B illustrate general examples of how information may be communicated between the vehicle and the user. In particular, FIGS. 15A and 15B are pictorial and functional diagrams, respectively, of an example system 1500 that includes a plurality of computing devices 1502, 1504, 1506, 1508 and a storage system 1510 connected via a network 1512. System 1500 also includes vehicles 1514, which may be configured the same as or similarly to vehicles 100 and 120 of FIGS. 1A-B and 1C-D, respectively. Vehicles 1514 may be part of a fleet of vehicles. Although only a few vehicles and computing devices are depicted for simplicity, a typical system may include significantly more.

As shown in FIG. 15B, each of computing devices 1502, 1504, 1506 and 1508 may include one or more processors, memory, data and instructions. Such processors, memories, data and instructions may be configured similarly to the ones described above with regard to FIG. 2. The various computing devices and vehicles may communication via one or more networks, such as network 1512. The network 1512, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1502 may include one or more server computing devices having a plurality of computing devices, e.g., a load balanced server farm, that exchange information with different nodes of a network for the purpose of receiving, processing and transmitting the data to and from other computing devices. For instance, computing device 1502 may include one or more server computing devices that are capable of communicating with the computing devices of vehicles 1514, as well as computing devices 1504, 1506 and 1508 via the network 1512. For example, vehicles 1514 may be a part of a fleet of vehicles that can be dispatched by a server computing device to various locations. In this regard, the computing device 1502 may function as a dispatching server computing system which can be used to dispatch vehicles to different locations in order to pick up and drop off passengers or to pick up and deliver packages or other cargo such as groceries. In addition, server computing device 1502 may use network 1512 to transmit and present information to a user of one of the other computing devices or a rider of a vehicle. In this regard, computing devices 1504, 1506 and 1508 may be considered client computing devices.

As shown in FIG. 15A each client computing device 1504, 1506 and 1508 may be a personal computing device intended for use by a respective user 1516, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone and/or hands-free sensors such as mm-wave sensors). The client computing devices may also include a camera for recording video streams, speakers, a network interface device, and all of the components used for connecting these elements to one another. As indicated in FIG. 15B, device 1508 may be the device of a rider who is currently in the vehicle, while device 1506 may be the device of a user awaiting pickup.

Although the client computing devices may each comprise a full-sized personal computing device, they may alternatively comprise mobile computing devices capable of wirelessly exchanging data with a server over a network such as the Internet. By way of example only, client computing devices 1506 and 1508 may be mobile phones or devices such as a wireless-enabled PDA, a tablet PC, a wearable computing device (e.g., a smartwatch, smart glasses or smart clothing), or a netbook that is capable of obtaining information via the Internet or other networks.

In some examples, client computing device 1504 may be a remote assistance workstation used by an administrator or operator to communicate with riders of dispatched vehicles, or users awaiting pickup. Although only a single remote assistance workstation 1504 is shown in FIGS. 15A-B, any number of such workstations may be included in a given system. Moreover, although workstation 1504 is depicted as a desktop-type computer, the workstation 1504 may include various types of personal computing devices such as laptops, netbooks, tablet computers, etc.

Storage system 1510 can be of any type of computerized storage capable of storing information accessible by the server computing devices 1502, such as a hard-drive, memory card, ROM, RAM, DVD, CD-ROM, flash drive and/or tape drive. In addition, storage system 1510 may include a distributed storage system where data is stored on a plurality of different storage devices which may be physically located at the same or different geographic locations. Storage system 1510 may be connected to the computing devices via the network 1512 as shown in FIGS. 15A-B, and/or may be directly connected to or incorporated into any of the computing devices.

In a situation where there are one or more riders, the vehicle or remote assistance may communicate directly or indirectly with the rider client computing device(s). Here, for example, information may be provided to the passengers regarding current driving operations, changes to the route in response to the situation, pickup and/or drop off locations with or without indicating a level of uncertainty or variability in the locations, etc. As explained above, information may be passed from the vehicle to the rider or other user. For instance, when the user is awaiting pickup, the vehicle may send pickup information via network 1512. However, when the vehicle arrives at the pickup location or the user enters the vehicle, the vehicle may communicate directly with the user's device, e.g., via a Bluetooth™ or NFC communication link. Communication delays (e.g., due to network congestion, bandwidth limitations, coverage dead zones, etc.) may be factored in by the vehicle when deciding what specific information is provided by the vehicle to the user's device.

FIG. 16 illustrates a method of operation 1600 in accordance with the foregoing. The method comprises receiving, at block 1602 by one or more processors associated with a vehicle operating in an autonomous driving mode, trip information corresponding to a trip for a user. The trip information includes a point of interest. At block 1604, the method includes determining, by the one or more processors based on the point of interest, at least one of a pickup location or a drop off location. At block 1606, the method includes determining, by the one or more processors, an uncertainty for the at least one of the pickup location or the drop off location. Determining the uncertainty is based on one or more factors associated with the point of interest. At block 1608, the method includes selecting, by the one or more processors, visualization information based on (i) the pickup or drop off location, and (ii) the uncertainty. And at block 1610, the method includes transmitting the visualization information to a client device of the user for presentation on a user interface of the client device. The visualization information indicates (i) a pickup or drop off zone on a map, and (ii) a representation of the uncertainty.

Finally, as noted above, the technology is applicable for various types of vehicles, including passenger cars, buses, RVs, deliver trucks or other cargo vehicles, emergency vehicles, construction vehicles, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method, comprising:
receiving, by one or more processors, trip information corresponding to a trip for a user, the trip information including a point of interest;
determining, by the one or more processors based on the point of interest, at least one of a pickup location or a drop off location to which a vehicle will navigate in an autonomous driving mode;
determining, by the one or more processors, a current level of uncertainty indicating a likelihood as to where the at least one of the pickup location or the drop off location will be, wherein the current level of uncertainty is based on one or more factors associated with the point of interest at a current point in time;
updating, by the one or more processors, the current level of uncertainty based on changes to the one or more factors at a subsequent point in time;
selecting, by the one or more processors, visualization information based on (i) the pickup or drop off location, and (ii) the updated level of uncertainty; and
transmitting, by the one or more processors, the visualization information to a client device of the user for presentation on a user interface of the client device, the visualization information indicating (i) a pickup or drop off zone on a map, and (ii) a representation of the updated level of uncertainty.

2. The method of claim 1, wherein the visualization information is modifiable in response to user interaction with the user interface.

3. The method of claim 1, wherein determining the current level of uncertainty includes identifying a location variance based on one or more of traffic congestion, street regulations, or weather conditions.

4. The method of claim 3, wherein determining the current level of uncertainty further includes evaluating historical information associated with the point of interest.

5. The method of claim 1, wherein determining the current level of uncertainty includes evaluating a likelihood that another vehicle will be at the pickup or drop off zone for a minimum amount of time.

6. The method of claim 5, wherein evaluating the likelihood that another vehicle will be at the pickup or drop off zone for the minimum amount of time includes determining whether the minimum amount of time would coincide with a pickup or drop off action of the vehicle.

7. The method of claim 1, wherein the visualization information includes a viewfinder element that is modifiable in response to user interaction with the user interface of the client device.

8. The method of claim 7, wherein the visualization information further includes a location identifier that snaps to a road segment in response to the user interaction with the user interface of the client device.

9. The method of claim 8, wherein the location identifier includes an inner zone and an outer zone, the inner and outer zones providing an indicia to the user that one part of the pickup or drop off zone is a more likely pickup or drop off location than another part of the pickup or drop off zone.

10. The method of claim 1, wherein the visualization information includes an elongated bar aligned along a segment of roadway or a segment of sidewalk to indicate the pickup or drop off zone.

11. The method of claim 10, wherein the elongated bar includes a color difference, intensity or gradient to indicate to the user a relative size of the pickup or drop off zone along the segment of roadway or the segment of sidewalk.

12. The method of claim 10, wherein the elongated bar includes a geometric element therein, the geometric element indicating information about the pickup or drop off zone.

13. The method of claim 12, wherein the information about the pickup or drop off zone indicates the current level of uncertainty.

14. The method of claim 12, wherein a speed of travel of the geometric element within the elongated bar correlates with the current level of uncertainty.

15. The method of claim 12, wherein the geometric element comprises a set of nested geometric objects having different appearances.

16. The method of claim 12, wherein the visualization information further includes a tag pointing to the geometric element, the tag providing textual or graphical information about a time of arrival at the pickup or drop off zone.

17. The method of claim 16, wherein the tag moves away from and towards the geometric element to accentuate information about the pickup or drop off zone.

18. The method of claim 16, wherein the visualization information further includes textual information for presentation on a card portion of the user interface adjacent to the map.

19. The method of claim 1, wherein the one or more processors are part of an onboard control system of the vehicle.

20. The method of claim 1, wherein the one or more processors are part of a remote server system in real time communication with the vehicle.

21. A vehicle operating in an autonomous driving mode, the vehicle comprising:
a perception system;
a memory configured to store information including instructions and data; and
one or more processors configured to:
access the information stored in the memory;
receive trip information corresponding to a trip for a user, the trip information including a point of interest;
determine, based on the point of interest, at least one of a pickup location or a drop off location to which the vehicle will navigate in the autonomous driving mode;
determine a current level of uncertainty indicating a likelihood as to where the at least one of the pickup location or the drop off location will be, wherein the current level of uncertainty is based on one or more factors associated with the point of interest at a current point in time;
update the current level of uncertainty based on changes to the one or more factors at a subsequent point in time;
select visualization information based on (i) the pickup or drop off location, and (ii) the updated level of uncertainty; and
transmit the visualization information to a client device of the user for presentation on a user interface of the client device, the visualization information indicating (i) a pickup or drop off zone on a map, and (ii) a representation of the updated level of uncertainty.

* * * * *